United States Patent
Pang et al.

(10) Patent No.: US 11,825,577 B2
(45) Date of Patent: Nov. 21, 2023

(54) DISPLAY APPARATUS AND STEP POWER CIRCUIT

(71) Applicant: HISENSE VISUAL TECHNOLOGY CO., LTD., Shandong (CN)

(72) Inventors: Zhenhua Pang, Shandong (CN); Jie Yang, Shandong (CN); Guangxue Liu, Shandong (CN); Yuxin Zhang, Shandong (CN); Caixia Zhao, Shandong (CN); Aichen Xu, Shandong (CN)

(73) Assignee: Hisense Visual Technology Co., Ltd., Shandong (CN)

( * ) Notice: Subject to any disclaimer, the term of this patent is extended or adjusted under 35 U.S.C. 154(b) by 0 days.

(21) Appl. No.: 17/900,166

(22) Filed: Aug. 31, 2022

(65) Prior Publication Data

US 2022/0418070 A1    Dec. 29, 2022

Related U.S. Application Data

(63) Continuation of application No. PCT/CN2021/095347, filed on May 21, 2021.

(30) Foreign Application Priority Data

Aug. 24, 2020  (CN) .......................... 202010857296.4
Feb. 1, 2021   (CN) .......................... 202110138504.X
Feb. 7, 2021   (CN) .......................... 202110177726.2

(51) Int. Cl.
*H05B 45/30*  (2020.01)
*H05B 45/36*  (2020.01)
(Continued)

(52) U.S. Cl.
CPC ............. *H05B 45/36* (2020.01); *H05B 45/34* (2020.01); *H05B 45/382* (2020.01); *H05B 45/385* (2020.01)

(58) Field of Classification Search
CPC ........ H05B 45/10; H05B 45/14; H05B 45/30; H05B 45/34; H05B 45/36; H05B 45/39;
(Continued)

(56) References Cited

U.S. PATENT DOCUMENTS 9,596,725 B2 *  3/2017  Hu ....................... H05B 45/375
9,743,468 B2 *  8/2017  Strijker ................. H02M 7/217
(Continued)

FOREIGN PATENT DOCUMENTS

CN    102098853 A     6/2011
CN    202058426 U     11/2011
(Continued)

*Primary Examiner* — Tung X Le
(74) *Attorney, Agent, or Firm* — Meunier Carlin & Curfman LLC

(57) ABSTRACT

A display apparatus with a power supply circuit is provided. The power supply circuit is connected with a light emitting diode (LED) drive circuit, a filter circuit and a feedback circuit in the display apparatus. The power supply circuit includes a fixed-voltage power supply element and a variable-voltage power supply element, and the fixed-voltage power supply element is superposed on the variable-voltage power supply element and configured to supply power to the LED drive circuit in a stepped manner; and a controller is configured to control a voltage of the variable-voltage power supply element according to a variation of the output voltage feedback from the feedback circuit.

9 Claims, 21 Drawing Sheets

(51) Int. Cl.
*H05B 45/34* (2020.01)
*H05B 45/385* (2020.01)
*H05B 45/382* (2020.01)

(58) Field of Classification Search
CPC .. H05B 45/305; H05B 45/345; H05B 45/355; H05B 45/382; H05B 45/385
See application file for complete search history.

(56) References Cited

U.S. PATENT DOCUMENTS

| | | | |
|---|---|---|---|
| 10,483,850 B1 * | 11/2019 | Homsi | H02M 3/1584 |
| 11,263,959 B2 * | 3/2022 | Joo | G09G 3/32 |
| 2012/0250360 A1 * | 10/2012 | Orr | H02M 3/335 |
| | | | 363/21.02 |
| 2013/0009568 A1 * | 1/2013 | Yu | H02M 3/33561 |
| | | | 315/297 |
| 2014/0152195 A1 | 6/2014 | Zhang et al. | |
| 2017/0288557 A1 * | 10/2017 | Fang | H02M 1/4258 |

FOREIGN PATENT DOCUMENTS

| | | |
|---|---|---|
| CN | 202102692 U | 1/2012 |
| CN | 102523406 A | 6/2012 |
| CN | 202514139 U | 10/2012 |
| CN | 102833912 A | 12/2012 |
| CN | 102917516 A | 2/2013 |
| CN | 103813589 A | 5/2014 |
| CN | 103872898 A | 6/2014 |
| CN | 203675399 U | 6/2014 |
| CN | 104703346 A | 6/2015 |
| CN | 205792257 U | 12/2016 |
| CN | 106549588 A | 3/2017 |
| CN | 206294082 U | 6/2017 |
| CN | 107454712 A | 12/2017 |
| CN | 206948672 U | 1/2018 |
| CN | 207070393 U | 3/2018 |
| CN | 107909969 A | 4/2018 |
| CN | 207251987 U | 4/2018 |
| CN | 108364613 A | 8/2018 |
| CN | 111901932 A | 11/2020 |
| CN | 112785971 A | 5/2021 |
| EP | 2615887 A2 | 7/2013 |

* cited by examiner

US 11,825,577 B2

DISPLAY APPARATUS AND STEP POWER CIRCUIT

CROSS REFERENCE TO RELATED APPLICATIONS

This application is a continuation application of International Application No. PCT/CN2021/095347 filed on May 21, 2021, which claims the benefit of priority to Chinese Patent Application No. 202110138504.X, filed on Feb. 1, 2021, Chinese Patent Application No. 202110177726.2, filed on Feb. 7, 2021, and Chinese Patent Application No. 202010857296.4, filed on Aug. 24, 2020, which are incorporated herein by reference in their entireties.

FIELD

The disclosure relates to display apparatus, in particular to a display apparatus and a step power supply circuit.

BACKGROUND

With the development of the electronic technology, the integration level of the electronic device including the display apparatus is becoming higher, which leads to higher demands for the power source of the display apparatus. After most display apparatuses receive mains alternating currents through plugs, special power supply circuits are employed to convert the alternating currents into direct currents and perform voltage transform, so as to supply power to the loads in the display apparatuses.

SUMMARY

Embodiments of the disclosure provide a display apparatus, comprising: a power supply circuit; and a light emitting diode (LED) drive circuit, a filter circuit and a feedback circuit in connection with the power supply circuit; wherein the filter circuit is further connected with the feedback circuit; wherein the power supply circuit is configured to supply power to the LED drive circuit; the power supply circuit comprises a fixed-voltage power supply element and a variable-voltage power supply element, and the fixed-voltage power supply element is superposed on the variable-voltage power supply element and configured to supply power to the LED drive circuit in a stepped manner; the filter circuit is configured to filter a voltage ripple in an output voltage of the fixed-voltage power supply element; the feedback circuit is configured to sample an output voltage of the filter circuit and feedback a variation of the output voltage to a controller of the variable-voltage power supply element; and the controller is configured to control a voltage of the variable-voltage power supply element according to the variation of the output voltage feedback from the feedback circuit.

DETAILED DESCRIPTION OF THE EMBODIMENTS

Description will herein be made with respect to illustrative examples, instances of which are illustrated in the accompanying drawings. For the descriptions related to the accompanying drawings, the same numerals in different accompanying drawings refer to the same or similar elements unless otherwise indicated. The embodiments described below do not represent all embodiments consistent with the disclosure. Rather, they are merely examples of apparatus and methods consistent with some aspects of the disclosure as detailed in the appended claims.

Introduction to Power Supply of Display Apparatus

Figure 1:
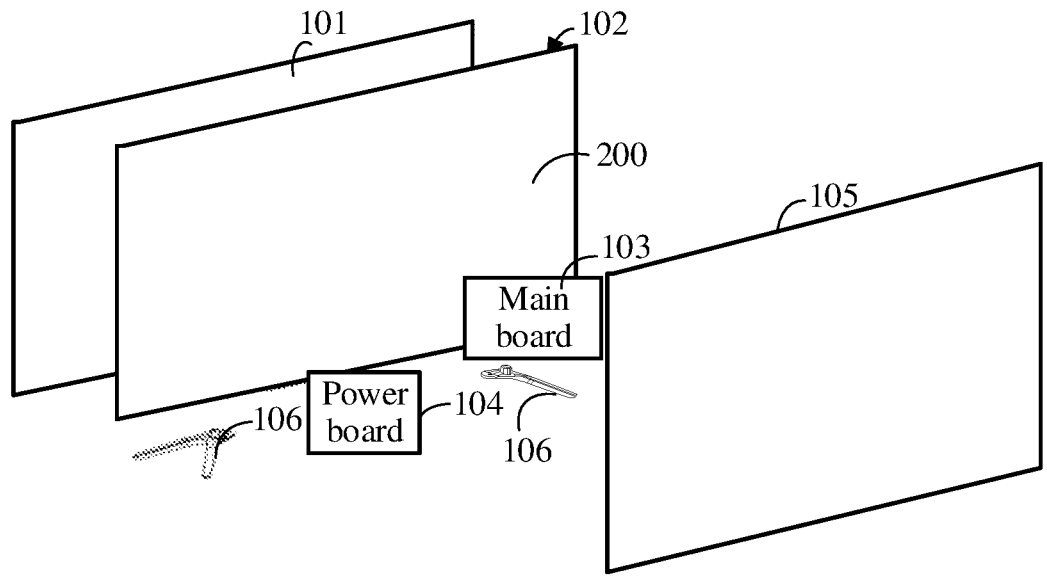
FIG. 1 is a structural schematic diagram of a display apparatus according to one or more embodiments of the disclosure.

As user demand for obtaining information keeps increasing, various types of display apparatuses, for example, computers, televisions, projectors, etc., emerge accordingly. A power supply circuit is one of the most important circuit structures in the display apparatus, and the power supply circuit may provide power support for the display apparatus, such that the display apparatus may operate normally. Some display apparatuses have independent power boards, and some display apparatuses combine the power boards and main boards into a whole. FIG. 1 is a structural schematic diagram of a display apparatus according to one or more embodiments of the disclosure. As shown in FIG. 1, the display apparatus includes a panel 101, a backlight assembly 102, a main board 103, a power board 104, a rear shell 105, and a base 106. The panel 101 is configured to present a picture for a user. The backlight assembly 102 is located below the panel 101, is usually an optical assembly, and is configured to supply sufficient brightness and evenly distributed light sources so as to make the panel 101 display an image properly. The backlight assembly 102 further includes a back plate 200. The main board 103 and the power board 104 are arranged on the back plate 200. A plurality of protrusion structures are usually provided on the back plate 200 in a stamping mode. The main board 103 and the power board 104 are fixed on the protrusions via screws or hooks. The rear shell 105 covers the panel 101 so as to hide parts of the display apparatus, for example, the backlight assembly 102, the main board 103 and the power board 104, such that a visual pleasing effect is achieved. The base 106 is configured to support the display apparatus.

Figure 2:
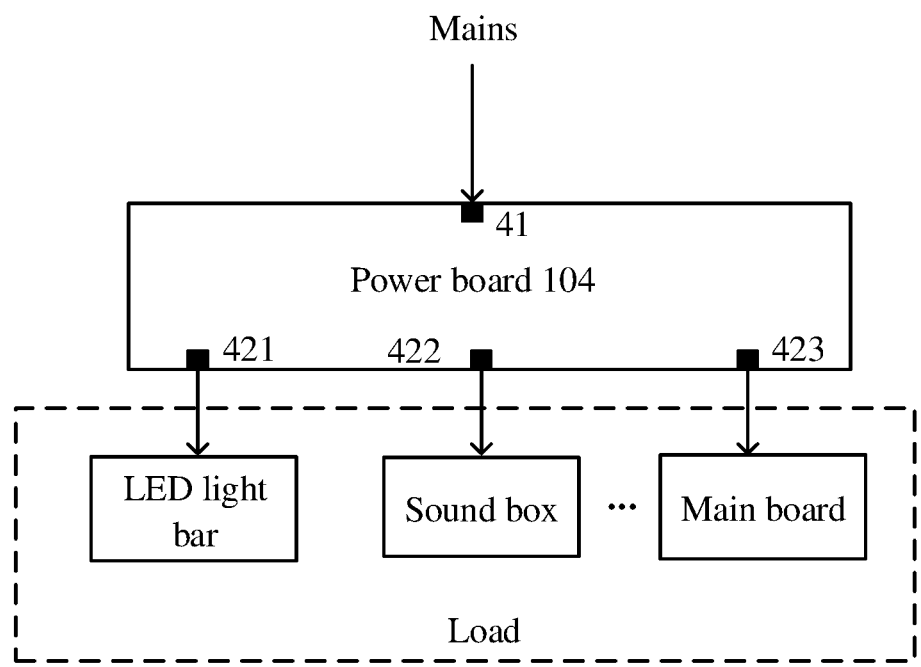
FIG. 2 is a schematic diagram of a connection relation between a power board and a load according to one or more embodiments of the disclosure.

FIG. 2 is a schematic diagram of a connection relation between a power board and a load according to one or more embodiments of the disclosure. As shown in FIG. 2, the power board 104 includes an input terminal 41 and an output terminal (shown as a first output terminal 421, a second output terminal 422, and a third output terminal 423), where the input terminal 41 is connected with mains, and the output terminal is connected with a load, for example, the first output terminal 421 is connected with an LED light bar used for lightening a display panel, the second output terminal 422 is connected with a sound box, and the third output terminal 423 is connected with the main board 103. The power board 104 is configured to convert the mains alternating current into a direct current required by the load, and the direct current typically has different specifications, for example, 18V for the sound box, 12V for the panel, etc.

Figure 3:
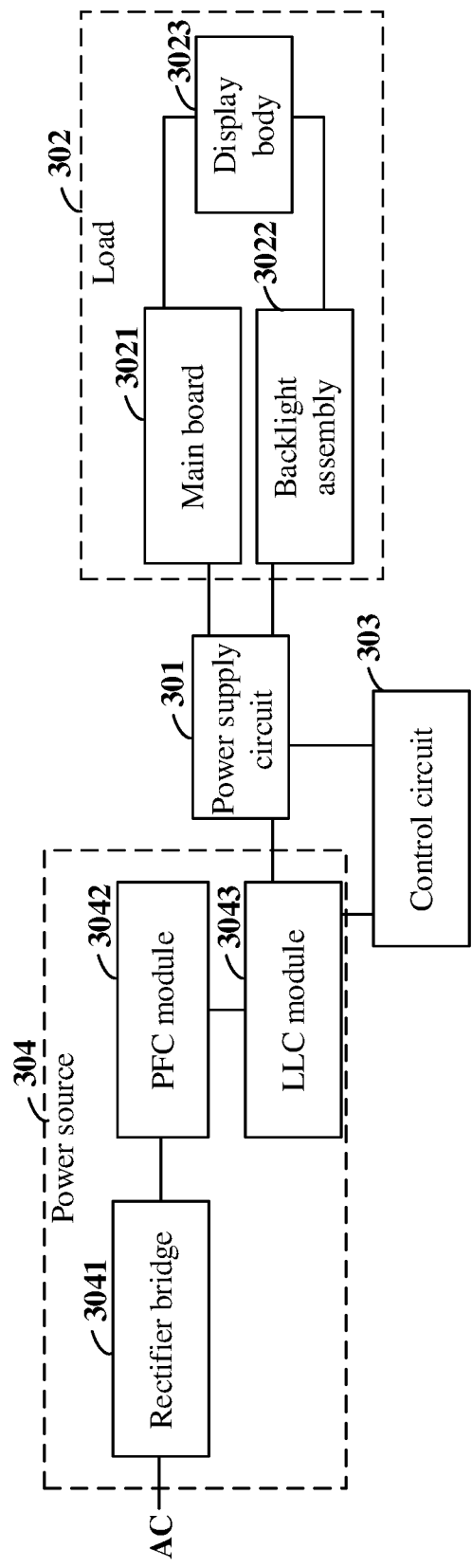
FIG. 3 is a schematic diagram of an architecture of a power source according to one or more embodiments of the disclosure.

In some embodiments, FIG. 3 is a schematic diagram of an architecture of a power source according to one or more embodiments of the disclosure. As shown in FIG. 3, a display apparatus may include: a power supply circuit 301, a load 302, a control circuit 303, and a power source 304, where the power source 304 includes: a rectifier bridge 3041, a power factor correction (PFC) module 3042, and a resonant converters (LLC) module 3043, and the LLC module 3043 includes a synchronous rectification circuit (not shown in FIG. 3). The PFC module 3042 is connected with the LLC module 3043, and the LLC module 3043 is connected with the power supply circuit 301 and the control circuit 303 separately. The rectifier bridge 3041 is configured to rectify the input alternating current and input a full-wave signal to the PFC module 3042. The PFC module 3042 is mainly configured to perform power factor correction on an input alternating current power source and output a stable direct current generatrix voltage (for example, 380V) to the LLC module 3043. The LLC module 3043 may reduce or increase a voltage of the direct current generatrix input by the PFC module 3042 and output a constant voltage to the load 302. The power source 304 may also include a flyback module (not shown in FIG. 3) for providing its own supply voltage and standby power to the PFC module 3042 and the LLC module 3043. The control circuit 303 may control conduction of the power supply circuit 301, that is, whether power energy output by the LLC module 3043 may supply power to the load 302 by means of the power supply circuit, so as to turn on or off the load. The power supply circuit 301 is also connected with the LLC module and the load. When the power supply circuit 301 is connected, the LLC module 3043 may supply power to the load 302, and when the power supply circuit 301 is disconnected, the LLC module 3043 may not supply power to the load 302. The load 302 includes a main board 3021, a backlight assembly 3022, a display body 3023, etc.

Reference may be made to related introduction of Application No. 202010192086.8, filed on 2020 Mar. 18, and entitled "Display Apparatus and Power Supply Circuit" and Application No. 202110137510.3, filed on 2021 Feb. 1, and entitled "Display Apparatus and Power Supply Circuit" for one or more embodiments of step power supply, and all of the related introduction. The contents of which are incorporated herein by reference in their entireties.

Supplying Step Power to a Drive Module of a Plurality of LED Light Bars

Figure 4:
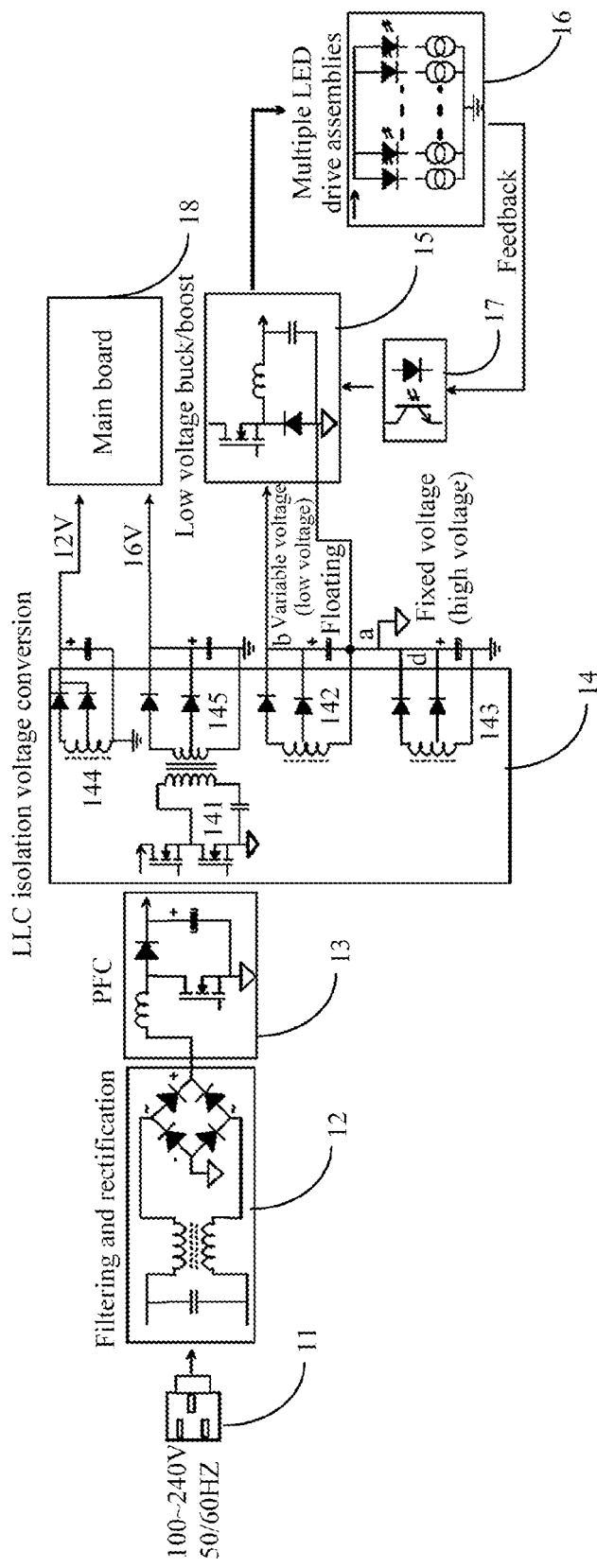
FIG. 4 is a structural schematic diagram of a power supply circuit according to one or more embodiments of the disclosure.

FIG. 4 is a structural schematic diagram of a power supply circuit according to one or more embodiments of the disclosure. As shown in FIG. 4, the power supply circuit includes: a power source 11, a filtering and rectification module 12, a PFC module 13, an LLC module 14, and a load. The load at least includes a main board 18 and a plurality of LED light bars as shown in the figure. At least two different LLC secondary windings are arranged in the LLC module 14, and configured to supply power to the plurality of LED light bars. For example, two LLC secondary windings may include: a first LLC secondary winding 142 and a second LLC secondary winding 143. An output terminal b of the first LLC secondary winding 142 outputs a first voltage, and an output terminal d of the second LLC secondary winding 143 outputs a second voltage. An output terminal d of the second LLC secondary winding 143 is connected with an input terminal a of the first LLC secondary winding 142. Moreover, an input terminal a and an output terminal b of the first LLC secondary winding 142 are connected with a voltage adjustment module 15. The voltage adjustment module 15 may be configured to adjust the first voltage output by the first LLC secondary winding 142, that is, the voltage adjusted by the voltage adjustment module 15 is recorded as a third voltage. The voltage adjustment module 15 may send the third voltage and a second voltage output by the second LLC secondary winding 143 to a voltage drive module 16 jointly, and the voltage drive module 16 supplies power to the plurality of LED light bars according to a sum of the second voltage and the third voltage.

In this case, the second voltage output by the second LLC secondary winding 143 is equivalent to a "fixed voltage" which does not change, and the first voltage output by the first LLC secondary winding 142 is equivalent to a "variable voltage" which may be variable. As a result, the adjustable variable voltage is added on the basis of the fixed second voltage for output, and the fixed voltage and the variable voltage output by the two secondary windings jointly supply power to the plurality of LED light bars. This power supply mode may be referred to as step power supply.

In some embodiments, the first voltage output by the first LLC secondary winding 142 is less than the second voltage output by the second LLC secondary winding 143. For example, assuming that sixteen LED light bars are provided in FIG. 4, and each light bar includes nine LED assemblies, the plurality of LED light bars require a voltage ranging from 51.3 V to 58.5 V and a total current of 1.92 A under the condition of 120 mA. As for step power supply achieved by means of a buck structure, the fixed second voltage output by the second LLC secondary winding 143 may be set to be 48 V, floating output of the first voltage output by the first LLC secondary winding 142 is set to be 12 V, and a voltage range adjusted by the voltage adjustment module may be set to be 3.3 V-10.5 V. In this case, DC-DC parameters for the buck topological structure include: an input voltage of 12 V, an output voltage ranging from 3.3 V-10.5 V, and an output current of 1.92 A. For step power supply achieved by means of a boost structure, the second voltage may be set to be 40 V, floating output of the first voltage may be set to be 10V, and DC-DC parameters of the boost topological structure include: an input voltage of 12V, an output voltage ranging from 11.3 V to 18.5 V, and an output current of 1.92 A.

According to the power supply circuit of the embodiments, two different secondary windings may be flexibly set to output two different voltages respectively, and the voltage adjustment module only needs to adjust the voltage output by the secondary winding with the smaller voltage, such that requirements for withstand voltage values of components of a switch transistor, a capacitor, etc. in the voltage adjustment module are reduced, an area of a printed circuit board (PCB) where the power supply circuit is located is reduced, and finally cost of the power supply circuit is reduced. When measurement is performed in the aspect of DC-DC conversion efficiency, a DC-DC loss of the power supply circuit using the buck topology may be calculated by 7 V*1.92 A*0.05/0.95+0.5 V*1.92 A=1.67 W, and in this case, total efficiency is 98.5%; and the DC-DC conversion efficiency is improved by 3.5%.

In some embodiments, the voltage drive module 16 may also send a feedback signal to the voltage adjustment module 15 according to a real-time current of the plurality of LED light bars when supplying power to the plurality of LED light bars, such that the voltage adjustment module 15 adjusts the first voltage into a new third voltage according to the feedback signal, so as to achieve timely and effective adjustment of the voltage by the voltage adjustment module.

In some embodiments, at least two connection relations of power supply and feedback are provided between the voltage adjustment module 15 and the voltage drive module 16, but when the voltage adjustment module 15 performs DC-DC adjustment, a grounding point of the voltage adjustment module 15 is connected with the output terminal of the second LLC secondary winding 143, and a voltage value is not grounded 0V but is equivalent to the output voltage of the first LLC secondary winding 142 adjusted on the basis of an output voltage value of the second LLC secondary winding 143. As a result, the feedback signal sent by the voltage drive module 16 to the voltage adjustment module also needs to pass through an optical coupler 17, and then the feedback signal goes through floating voltage conversion through the optical coupler. The feedback signal sent from the voltage drive module to the voltage adjustment module goes through optical coupler isolation, such that the floating voltage, on two sides of the optical coupler, of the voltage adjustment module 15 and an actual grounding voltage of the voltage drive module 16 are unified, and mutual influence of the floating voltage and the actual grounding voltage is prevented.

Figure 5:
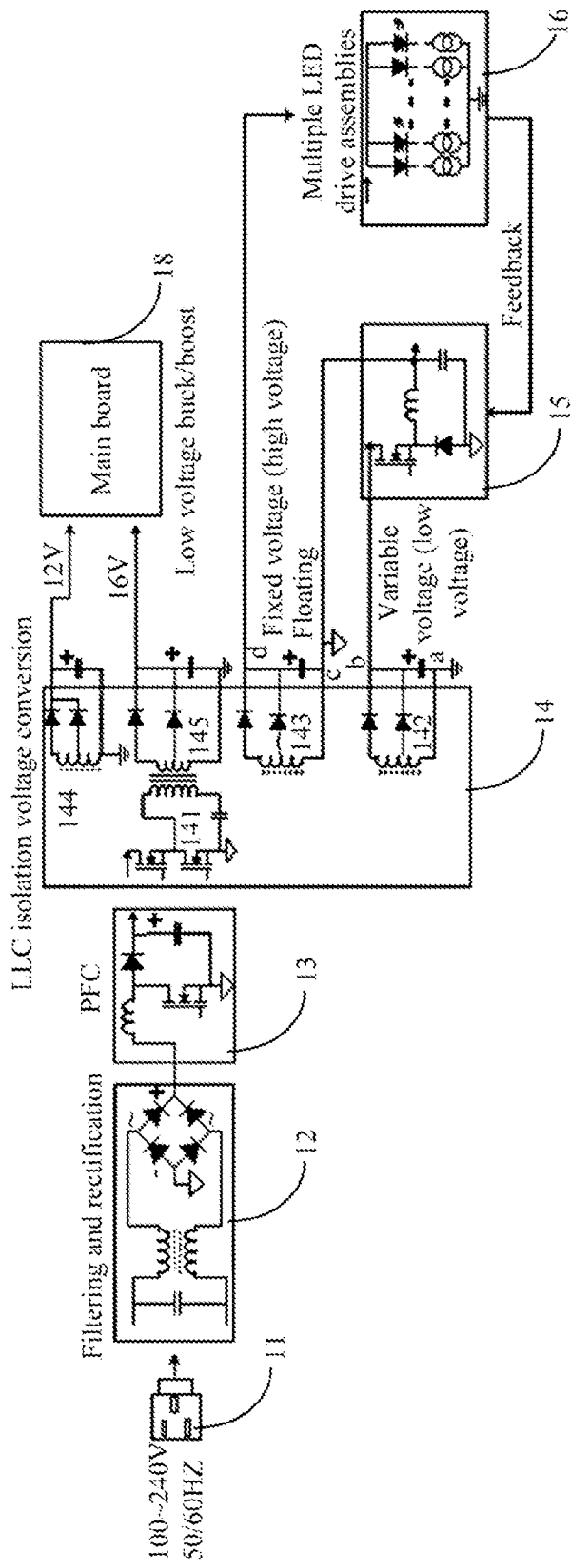
FIG. 5 is a structural schematic diagram of a power supply circuit according to one or more embodiments of the disclosure.

FIG. 5 is a structural schematic diagram of a power supply circuit according to one or more embodiments of the disclosure. As shown in FIG. 5, on the basis of the power supply circuit as shown in FIG. 4, the output terminal of the first LLC secondary winding 142 is connected with the input terminal of the second LLC secondary winding 143, and the output terminal of the second LLC secondary winding 143 supplies power to the plurality of LED light bars. In this case, as for the output voltage, adjusted by the voltage adjustment module 15, of the first LLC secondary winding 142, an input terminal of the first LLC secondary winding 142 is grounded instead of floating, such that in the embodiment as shown in FIG. 5, no optical coupler is arranged to isolate the feedback signal via an optical coupler.

Figure 6:
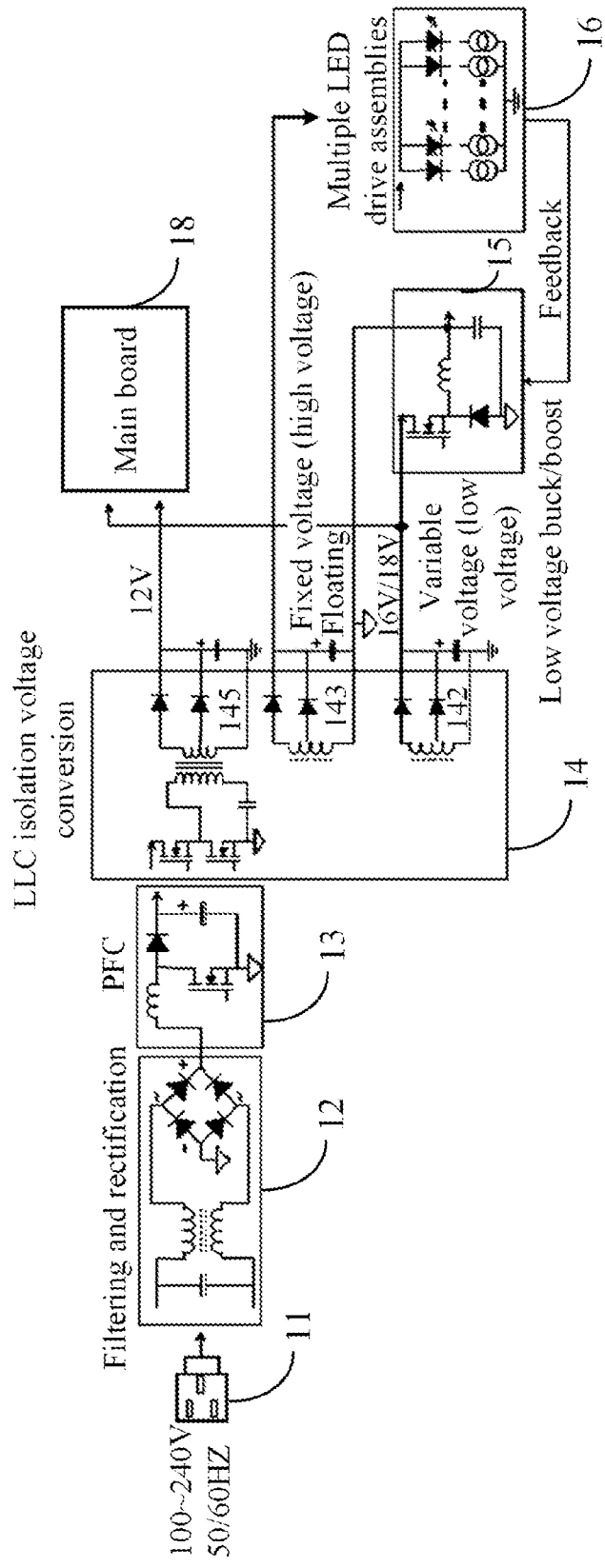
FIG. 6 is a structural schematic diagram of a power supply circuit according to one or more embodiments of the disclosure.

FIG. 6 is a structural schematic diagram of a power supply circuit according to one or more embodiments of the disclosure. As shown in FIG. 6, on the basis of the power supply circuit shown in FIG. 4, when a required variation range of the first voltage output by the first LLC secondary winding 142 may be 16 V/18 V, a secondary winding which may provide a 16 V/18 V voltage for the main board may serve as the first LLC secondary winding 142. In this case, no first LLC secondary winding needs to be independently arranged additionally, so as to further reduce complexity of the power supply circuit, and further to reduce cost. In some embodiments, when the required variation range of the first voltage is within 12 V, a secondary winding which may provide a 12 V voltage for the main board may serve as the first LLC secondary winding. In some embodiments, a secondary winding may provide a certain voltage for other loads may also serve as the illustrated first LLC secondary winding, etc.

Individually Supplying Step Power to One of the Plurality of LED Light Bars

Figure 7:
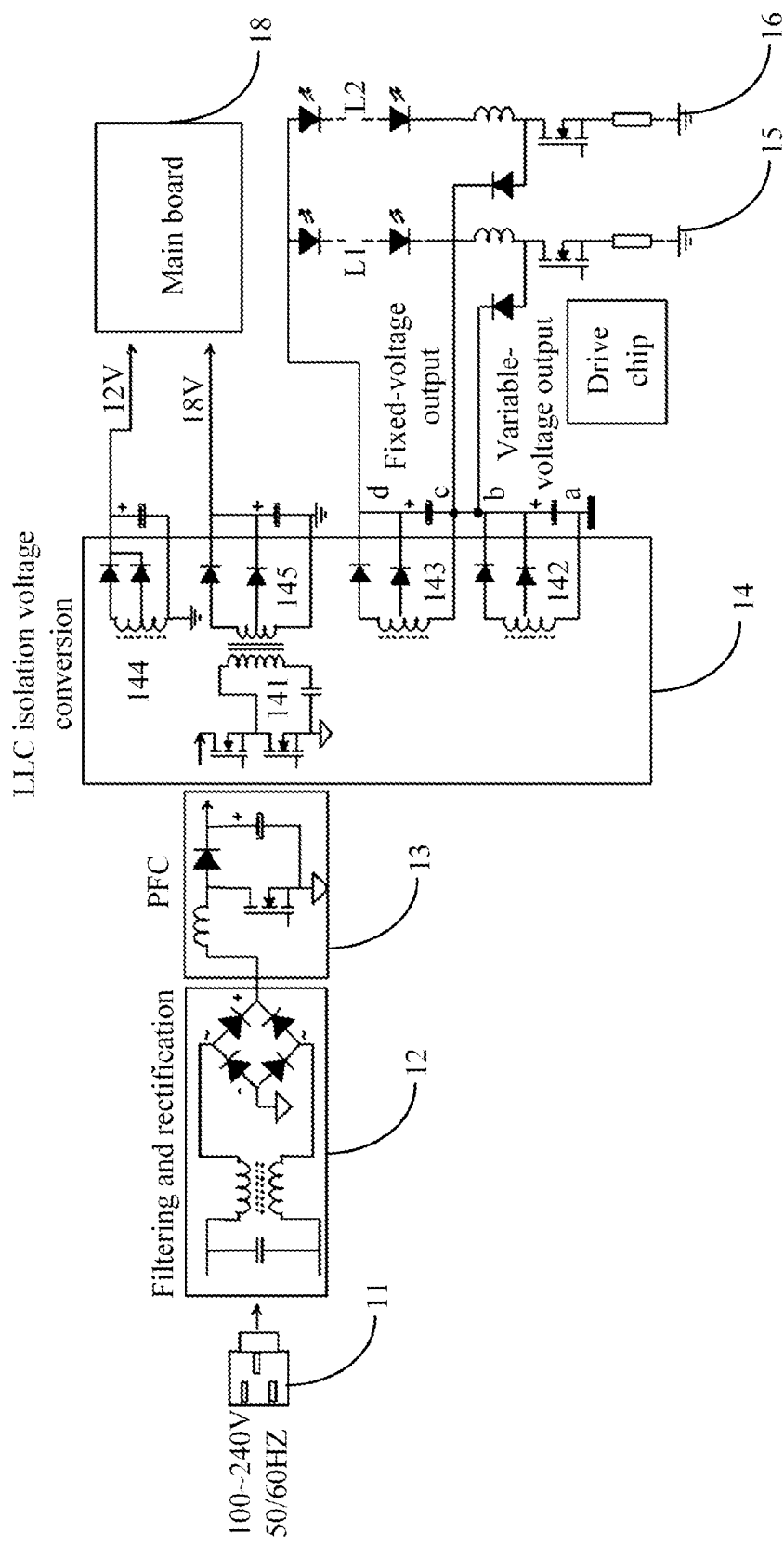
FIG. 7 is a structural schematic diagram of a power supply circuit according to one or more embodiments of the disclosure.

FIG. 7 is a structural schematic diagram of a power supply circuit according to one or more embodiments of the disclosure. As shown in FIG. 7, the power supply circuit includes: a power source 11, a filtering and rectification module 12, a PFC module 13, an LLC module 14, and a load. The load at least includes a main board 18, an LED light bar L1, and an LED light bar L2. A secondary winding 144 outputs and supplies a 12 V voltage to the main board 18 according to a voltage of a primary winding 141, and a secondary winding 145 outputs and supplies a 18 V voltage to the main board 18 according to the voltage of the primary winding 141. Two different LLC secondary windings are arranged in the LLC module 14 to supply power to at least one LED light bar, and the two different LLC secondary windings include: a first LLC secondary winding 142 and a second LLC secondary winding 143. An input terminal a of the first LLC secondary winding 142 is grounded, an output terminal b of the first LLC secondary winding 142 is connected with an input terminal c of the second LLC secondary winding 143, and an output terminal d of the second LLC secondary winding 143 is connected with positive electrodes of the LED lights bars L1 and L2 separately. The output terminal b of the first secondary winding 142 is configured to output a first voltage, a voltage adjustment module 15 which is connected with the LED light bar L1 and is achieved based on a buck circuit may be configured to adjust the first voltage output by the first LLC secondary winding 142, the adjusted voltage is denoted as a third voltage, and the voltage adjustment module 15 may send the third voltage to the input terminal c of the second LLC secondary winding 143. The second LLC secondary winding 143 is configured to output a second voltage, and the output terminal d of the second LLC secondary winding 143 sends a sum of the third voltage and the second voltage to the LED light bar L1 for power supply. Similarly, a voltage adjustment module 16 which is connected with the LED light bar L2 and is achieved based on a buck circuit may be configured to adjust the first voltage output by the first LLC secondary winding 142, the adjusted voltage is denoted as a fourth voltage, and the voltage adjustment module 15 may send the fourth voltage to the input terminal c of the second LLC secondary winding 143. The second LLC secondary winding 143 is configured to output the second voltage, and the output terminal d of the second LLC secondary winding 143 sends a sum of the fourth voltage and the second voltage to the LED light bar L2 for power supply.

In some embodiments, the first voltage output by the first LLC secondary winding 142 is less than the second voltage output by the second LLC secondary winding 142. A sum of a voltage of a fixed voltage portion and a voltage of a variable voltage portion needs to be greater than an overall voltage drop required by the LED light bar, and otherwise, the circuit may not work normally. Moreover, a voltage drop of the fixed voltage portion may not be greater than a minimum voltage required by lighting of the LED light, and otherwise, the LED light bar may be lightened without control.

Figure 8:
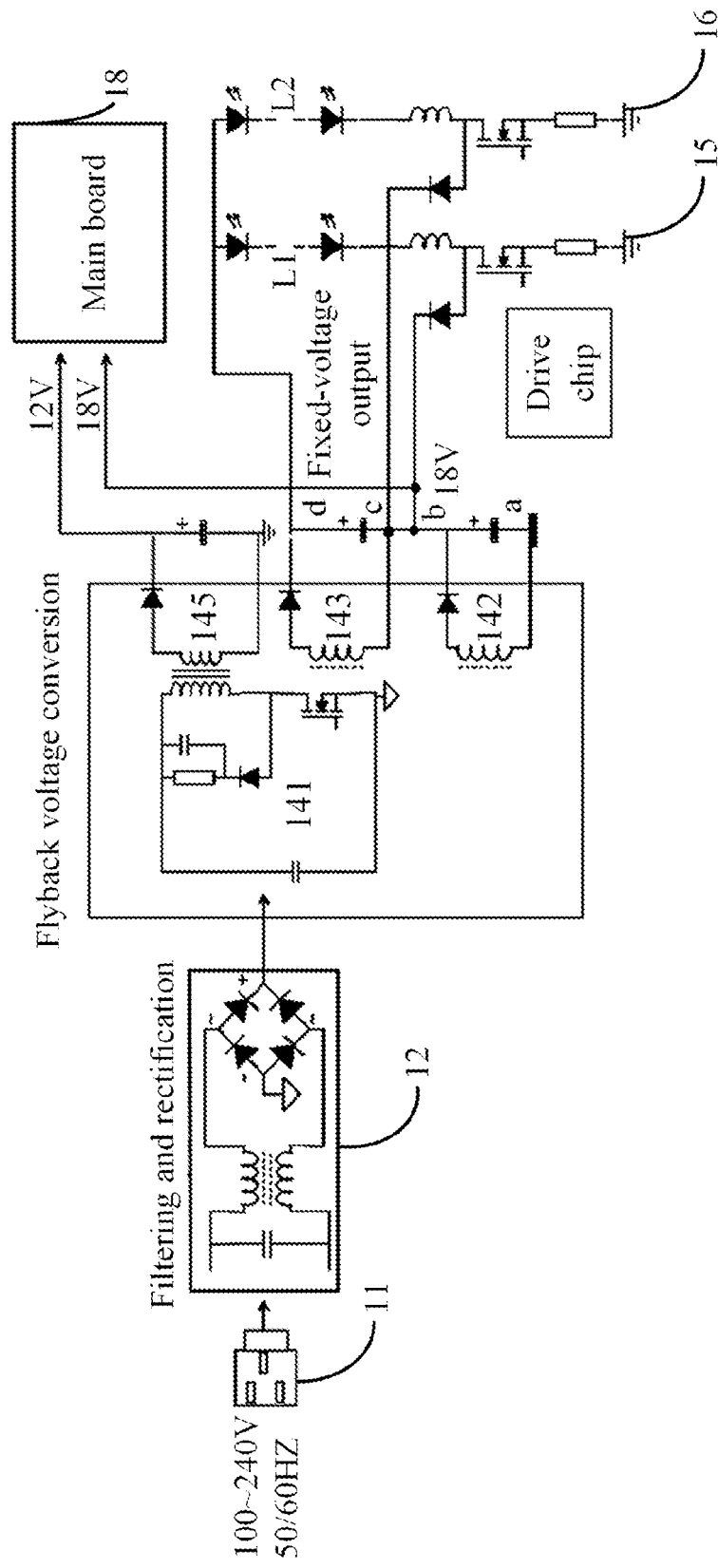
FIG. 8 is a structural schematic diagram of a power supply circuit according to one or more embodiments of the disclosure.

FIG. 8 is a structural schematic diagram of a power supply circuit according to one or more embodiments of the disclosure. The power supply circuit as shown in FIG. 8 and the power supply circuit shown in FIG. 7 both use the following solution: two different secondary windings are arranged to output two different voltages respectively to jointly supply power to the LED light bar, and the voltage adjustment module 15 only needs to adjust the voltage output by the secondary winding with a smaller voltage. The difference is that in the embodiments as shown in FIG. 8, the power supply circuit uses a single flyback structure, and the first LLC secondary winding 142 and the second LLC secondary winding 143 are arranged to output a voltage by means of a primary winding in the single flyback structure; and in the embodiments as shown in FIG. 7, the first LLC secondary winding 142 and the second LLC secondary winding 143 are arranged to output a voltage by means of a primary winding in the LLC module.

Figure 9:
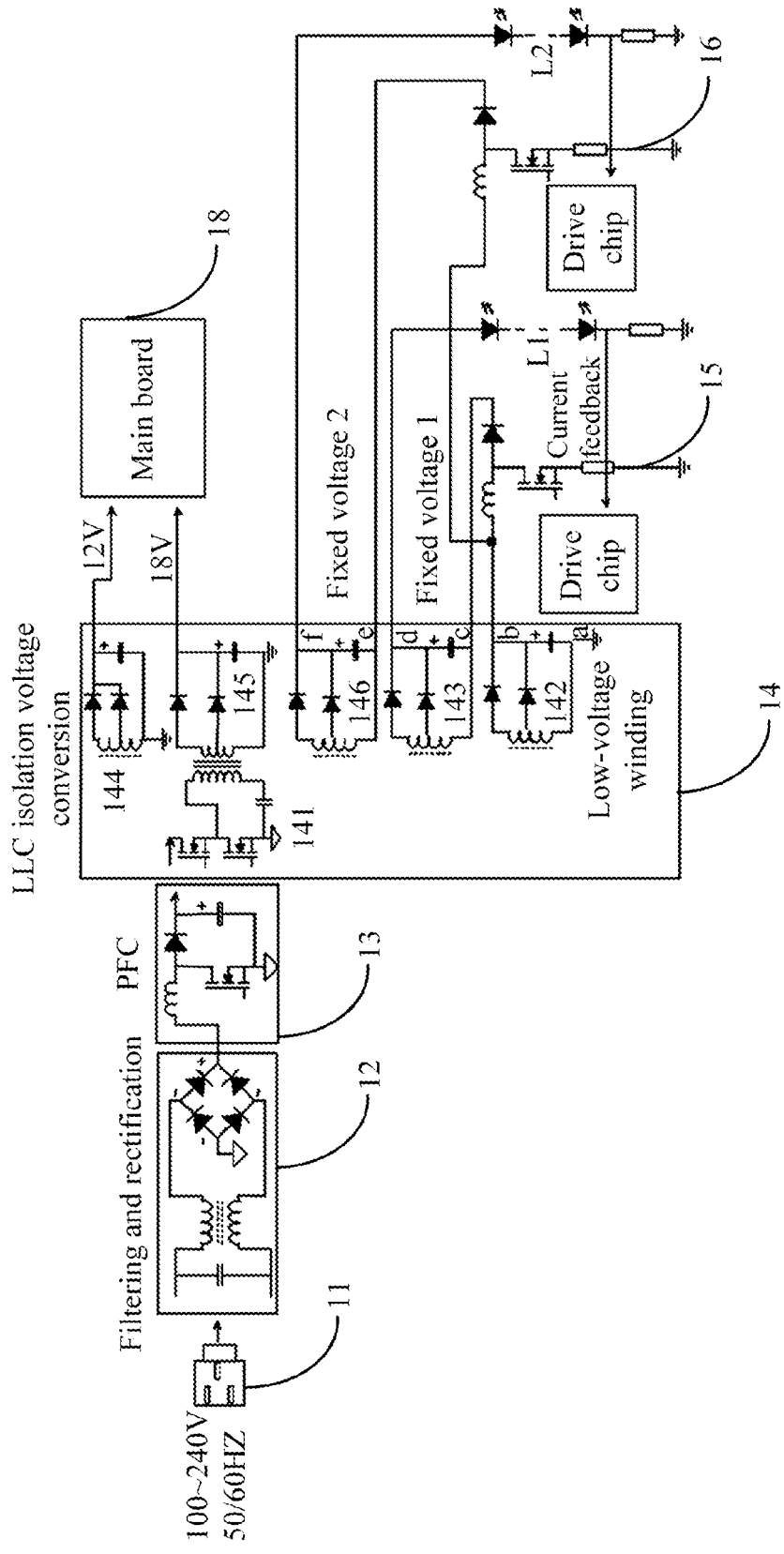
FIG. 9 is a structural schematic diagram of a power supply circuit according to one or more embodiments of the disclosure.

FIG. 9 is a structural schematic diagram of a power supply circuit according to one or more embodiments of the disclosure. As shown in FIG. 9, as an example of a power supply circuit supplying power to two LED light bars L1 and L2, three different LLC secondary windings are arranged in an LLC module 14 to supply power to the LED light bars L1 and L2, and include: a first LLC secondary winding 142, and two second LLC secondary windings 143 and 146. An input terminal a of the first secondary winding 142 is grounded, an output terminal b of the first secondary winding 142 is connected with a voltage adjustment module 15 and a voltage adjustment module 16, an input terminal c of the second LLC secondary winding 143 is connected with the voltage adjustment module 15, an output terminal d is connected with the LED light bar L1, an input terminal e of the second LLC secondary winding 146 is connected with the voltage adjustment module 16, and an output terminal f is connected with the LED light bar L2. It is noted that when the power supply circuit supplies power to more LED light bars, a second secondary winding and a voltage adjustment module may be provided for each LED light bar and connected in a similar manner as in FIG. 15, which is implemented in a similar principle.

The voltage adjustment module 15 which is connected with the LED light bar L1 and is achieved based on a boost circuit may be configured to adjust a first voltage output by the first LLC secondary winding 142, the adjusted voltage is denoted as a third voltage, and the voltage adjustment module 15 may send the third voltage to the input terminal c of the second LLC secondary winding 143. The second LLC secondary winding 143 is configured to output a second voltage, and the output terminal d of the second LLC secondary winding 143 sends a sum of the third voltage and the second voltage to the LED light bar L1 for power supply. Similarly, the voltage adjustment module 16, which is connected with the LED light bar L2 and is achieved based on a boost circuit, may be configured to adjust the first voltage output by the first LLC secondary winding 142 which is denoted as a fourth voltage. The voltage adjustment module 15 may send the fourth voltage to the input terminal e of the second LLC secondary winding 146. The second LLC secondary winding 146 is configured to output a fifth voltage, and an output terminal f of the second LLC secondary winding 143 sends a sum of the fourth voltage and the fifth voltage to the LED light bar L2 for power supply.

In some embodiments, the power supply circuit uses an LLC module for power supply, a first secondary winding, a second secondary winding and a third secondary winding are arranged in the LLC module. In some embodiments, the power supply circuit may also use a first secondary winding and a second secondary winding arranged in a single flyback structure, and a voltage is output by means of a primary winding in the single flyback structure.

Figure 10:
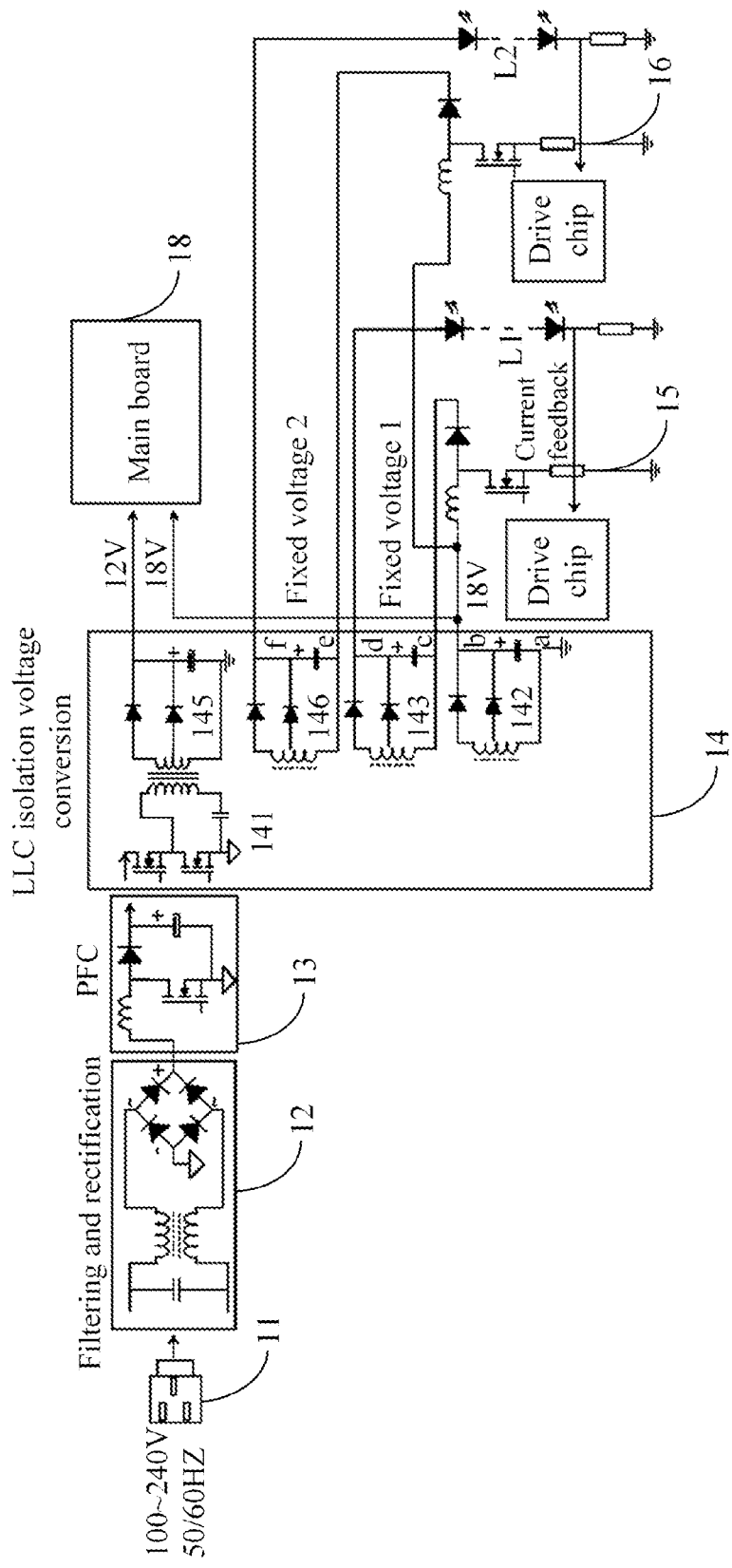
FIG. 10 is a structural schematic diagram of a power supply circuit according to one or more embodiments of the disclosure.

FIG. 10 is a structural schematic diagram of a power supply circuit according to one or more embodiments of the disclosure. In the power supply circuit as shown in FIG. 10, on the basis of the power supply circuit as shown in FIG. 9, when a required variation range of the first voltage output by the first LLC secondary winding 142 is 18 V, a secondary winding which can provide a 18 V voltage for the main board 18, may serve as the first LLC secondary winding. In this case, no first LLC secondary winding needs to be independently arranged additionally, and compared with the embodiment as shown in FIG. 9, complexity of the power supply circuit may be further reduced to reduce cost. It is appreciated that the 18 V voltage of the main board 18 is merely illustrated as an example in FIG. 10, and when a required variation range of the first voltage is within 12 V, a secondary winding may provide a 12 V voltage for the main board 18 may serve as the first LLC secondary winding 142. Alternatively, in other implementations, a secondary winding may provide a certain voltage for other loads may also serve as the illustrated first LLC secondary winding 142.

Negative-Voltage Step Power Supply

In some embodiments, according to a power supply circuit provided in the disclosure, only one LLC secondary winding needs to be arranged in an LLC module to provide a reverse voltage, and the other LLC secondary winding provides a first forward voltage, such that the two LLC secondary windings may be connected in parallel to provide a voltage for drive assemblies of a plurality of LED light bars connected with a plurality of voltage conversion circuits simultaneously. Then the plurality of voltage conversion circuits may be connected with output of one LLC secondary winding and one negative voltage grounding point. As a result, parallel connection of the plurality of voltage conversion circuits in the power supply circuit is achieved, and the LLC secondary windings supply power to the plurality of LED drive assemblies simultaneously. In this case, the plurality of voltage conversion circuits may provide currents needed by the LED drive assemblies which are connected with the plurality of LED light bars respectively, and all large currents are not provided completely by one secondary winding, such that the currents output by the secondary windings may not be too large, and step power supply may be achieved without more secondary windings. As a result, a circuit structure of the power supply circuit is simplified.

Figure 11:
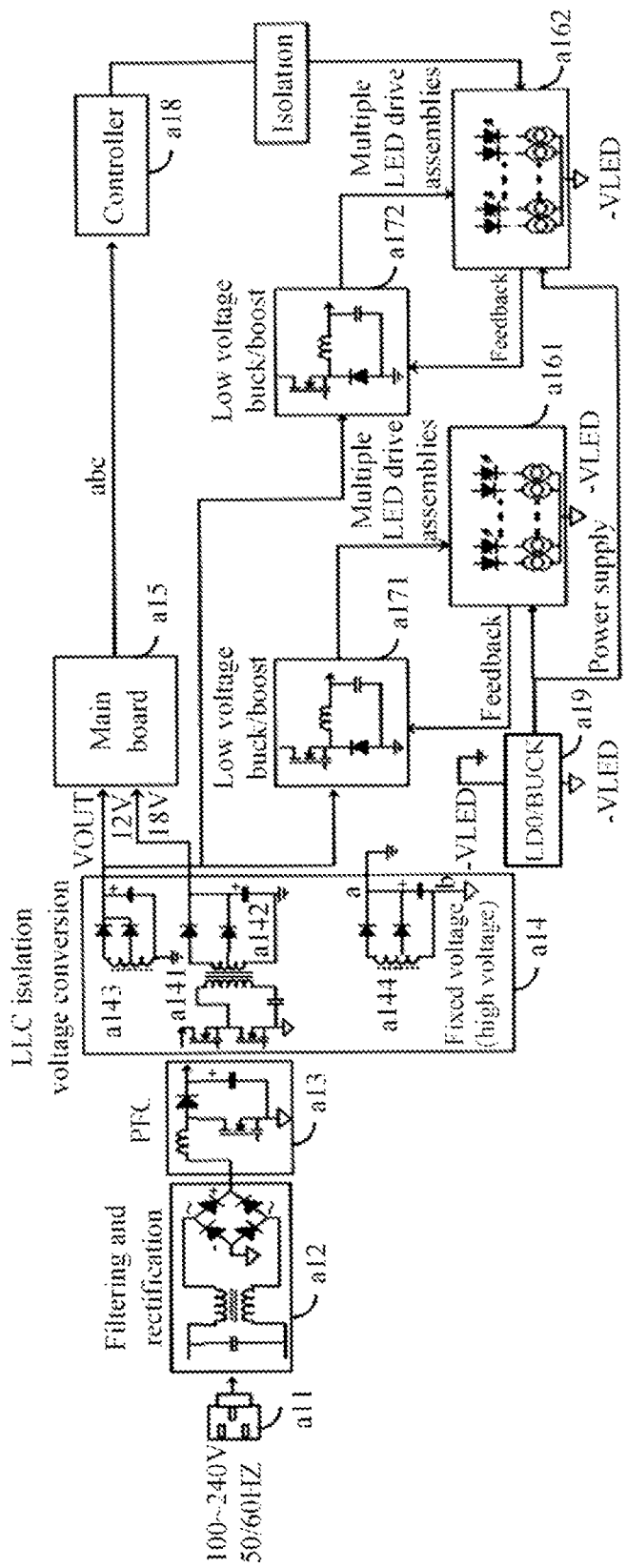
FIG. 11 is a schematic diagram of a display apparatus according to one or more embodiments of the disclosure.

FIG. 11 is a schematic diagram of a display apparatus according to one or more embodiments of the disclosure. As shown in FIG. 11, as an example of an LED drive assembly a161 and an LED drive assembly a162, each LED drive assembly may be configured to supply power to the plurality of LED light bars, and the plurality of LED light bars connected with all the LED drive assemblies may be configured to lighten a display panel of the display apparatus jointly. The power supply circuit includes: a plug a11, a filtering and rectification module a12, a PFC module a13 and an LLC module a14. When the power supply circuit obtains a mains alternating current (100 V-240 V and 50 Hz-60 Hz) from the plug a11, the mains alternating current is processed by the filtering and rectification module a12 (rectifier bridge), the PFC module a13 and the LLC module a14 in sequence, and direct currents with different voltages are obtained to supply power to loads. For example, the LLC module a14 of the power supply circuit receives a direct current input voltage sent from the PFC module a13 by means of a primary winding a141, then a secondary winding a143 provides a 12 V voltage for a main board a18 according to a voltage of the primary winding a141, and a secondary winding a142 provides a 18 V voltage for the main board a18 according to the voltage of the primary winding a141. The above voltages of 12 V and 18 V are merely examples, and the secondary winding a142 and the secondary winding a143 may also provide other voltages for the main board a18.

In some embodiments, in the LLC module a14, a plurality of drive assemblies connected in parallel are supplied with power simultaneously according to two different secondary windings which are denoted as a first LLC secondary winding and a second LLC secondary winding. The first LLC secondary winding is configured to provide a first forward voltage for the plurality of LED drive assemblies, and the second LLC secondary winding is configured to provide a second reverse voltage for the plurality of LED drive assemblies.

In some embodiments, the above first LLC secondary windings providing the first forward voltage may be the secondary winding a143 (with a first voltage of 12 V) and the secondary winding a142 (with a first voltage of 18 V) described above. In an example as shown in FIG. 11, assuming that a first LLC secondary winding is the secondary winding a143, a positive electrode of the first LLC secondary winding is connected with a plurality of positive electrodes of a plurality of LED drive assemblies. The positive electrode of the first LLC secondary winding a143 is connected with the positive electrode of the LED drive assembly a161 and the positive electrode of the LED drive assembly a162 simultaneously, and a negative electrode of the first LLC secondary winding a143 is grounded. The first LLC secondary winding takes a reference ground as a reference level.

The second LLC secondary winding a144 in the LLC module a14 may provide the second reverse voltage. A positive electrode a of the second LLC secondary winding is grounded, and a negative electrode b of the second LLC secondary winding is connected with a plurality of negative electrodes of the plurality of LED drive assemblies separately, that is, the negative electrode of the second LLC secondary winding is connected with the negative electrode of the LED drive assembly a161 and the negative electrode of the LED drive assembly a162 simultaneously. As the second LLC secondary winding a144 may be configured to convert an input voltage of the LLC primary winding a141 into the second voltage, the negative electrode b of the second LLC secondary winding a144 is equivalent to providing the second reverse voltage.

In some embodiments, the power supply circuit further includes a plurality of voltage adjustment modules, each LED drive assembly is connected with one corresponding voltage adjustment module, each voltage adjustment module may be configured to adjust a voltage output to the LED assembly, and the voltage adjustment modules may be achieved by means of buck or boost structures or may be DC-DC chips. For example, the first LLC secondary winding of the LLC module a14 is connected with the LED drive assembly a161 by means of the voltage adjustment module a171 and is connected with the LED drive assembly a162 by means of the voltage adjustment module 172.

In combination with the first LLC secondary winding a143 and the second LLC secondary winding a144 of the LLC module a14 in the power supply circuit, as an example of the LED drive assembly a161 for explanation, when the primary winding a141 of the LLC module a14 receives an input voltage sent from the PFC module a13, the first LLC secondary winding a143 converts the input voltage into a first voltage (recorded as VOUT) and outputs the first voltage to the positive electrode of the LED drive assembly a161 through the voltage adjustment module a171. The second LLC secondary winding a144 converts the input voltage into a second voltage (recorded as −VLED) and outputs the second voltage to the negative electrode of the LED drive assembly a161. In this case, as for the LED drive assembly a161, the −VLED at the negative electrode serves as a reference ground level, and the voltage at two sides of the LED drive assembly a161 is a sum of absolute values of the first voltage VOUT and the second voltage −VLED. The second voltage −VLED output by the second LLC secondary winding a144 does not change and is denoted as a "fixed voltage", and the first voltage output by the first LLC secondary winding a143 may be adjusted by the voltage adjustment module a171 and is denoted as a "variable voltage", such that the fixed voltage and the variable voltage output by the two secondary windings jointly supply power to the plurality of LED light bars, so as to achieve step power supply.

In some embodiments, the first voltage VOUT output by the first LLC secondary winding a143 is less than an absolute value of the second voltage −VLED output by the second LLC secondary winding. The LED drive assembly a161 may also determine a working voltage of the LED light bar connected with the LED drive assembly a161 and send a feedback signal to the voltage adjustment module a171 when the working voltage changes, such that the voltage adjustment module a171 may adjust the voltage provided for the LED drive assembly a161 according to the feedback signal, and the LED drive assembly a161 may drive the LED light bar to keep a rated normal working current.

The power supply circuit of the embodiments may supply power to the plurality of voltage conversion circuits connected in parallel and the LED drive assemblies simultaneously by means of the first forward voltage of the first LLC secondary winding and the second reverse voltage of the second LLC secondary winding, such that the plurality of voltage conversion circuits may be connected with a forward output terminal of the first LLC secondary winding and connected with an end, providing −VLED, of the second LLC secondary winding, parallel connection of the plurality of voltage conversion circuits in the power supply circuit is achieved, and the LLC secondary winding supplies power to the plurality of LED drive assemblies simultaneously. In this case, the plurality of voltage conversion circuits may provide currents needed by the LED drive assemblies which are connected with the plurality of LED light bars respectively, the current output by each secondary winding is not too large, so as to reduce cost of the voltage conversion circuits, no more secondary windings need to be arranged, all the voltage conversion circuits may share the second LLC secondary winding, and step power supply may be achieved by means of a circuit structure with low cost and low circuit structure complexity.

Step Power Supply Feedback Circuit

Figure 12:
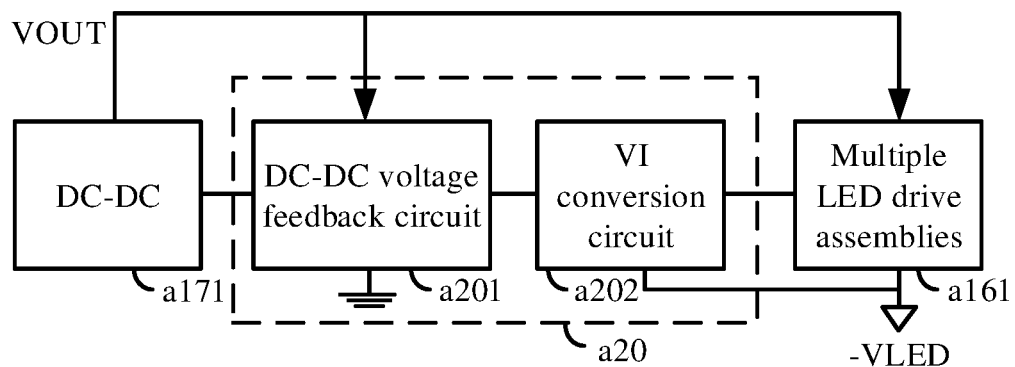
FIG. 12 is a structural schematic diagram of a feedback circuit according to one or more embodiments of the disclosure.

FIG. 12 is a structural schematic diagram of a feedback circuit according to one or more embodiments of the disclosure. As shown in FIG. 12, the feedback circuit is arranged between each LED drive assembly and a voltage adjustment module a171 in the embodiment as shown in FIG. 11, and is configured to receive a first feedback signal output by the LED drive assembly, convert the first feedback signal to obtain a second feedback signal corresponding to the voltage adjustment module a171, and finally send the second feedback signal to the voltage adjustment module a171. Specifically, a feedback circuit a20 arranged between an LED drive assembly a161 and a voltage adjustment module a171 in the power supply circuit of FIG. 11 is taken as an example. The feedback circuit a20 includes: a VI conversion circuit a202 and a DC-DC voltage feedback circuit a201. The VI conversion circuit a202 is configured to convert the first feedback signal, in a voltage signal form, sent from the LED drive assembly a161 into a second feedback signal, in a current signal form, corresponding to the DC-DC voltage feedback circuit a201, so as to achieve level conversion. The DC-DC voltage feedback circuit a201 is configured to receive the second feedback signal and send same to the voltage adjustment module a171.

Figure 13:
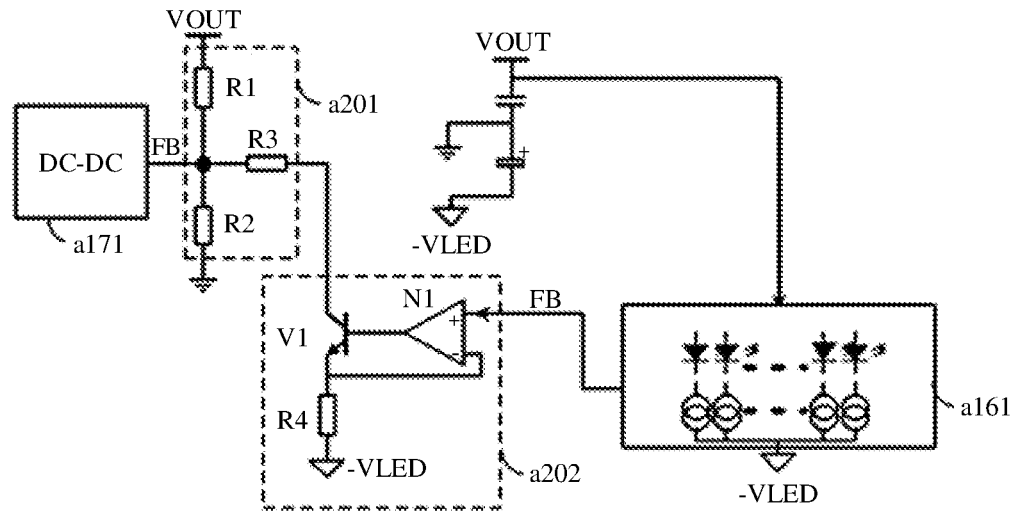
FIG. 13 is a structural schematic diagram of a feedback circuit according to one or more embodiments of the disclosure.

FIG. 13 is a structural schematic diagram of a feedback circuit according to one or more embodiments of the disclosure. As shown in FIG. 13, the VI conversion circuit a202 includes: an operational amplifier N1, a triode V1, and a first resistor R4. A first input terminal (which may be a positive electrode) of the operational amplifier N1 is connected with the LED drive assembly a161, a second input terminal (which may be a negative electrode) of the operational amplifier N1 is connected with a first end of the triode V1 and a first end of the first resistor R4, an output terminal of the operational amplifier N1 is connected with a control end of the triode V1, and a second end of the first resistor R4 is connected with a negative electrode of a second LLC secondary winding, such that a reference ground level of the VI conversion circuit a202 is −VLED at the negative electrode of the second LLC secondary winding. The DC-DC feedback circuit a201 includes: a second resistor R1, a third resistor R2 and a fourth resistor R3. A first end of the second resistor R1 is connected with an output terminal VOUT of the voltage adjustment module a171, a second end of the second resistor R1 is connected with a first end of the third resistor R2, a first end of the fourth resistor R3 and a feedback input terminal of the voltage adjustment module a171, a second end of the fourth resistor R3 is connected with a second end of the triode V1, and a second end of the third resistor R2 is grounded, such that the DC-DC feedback circuit a201 is connected with the reference ground.

In this way, when the operational amplifier N1 receives the first feedback signal FB sent by the LED drive assembly a161, the V1 is controlled to be conducted, then the DC-DC voltage feedback circuit a201 generates a current signal from VOUT to the reference ground and flowing through the second resistor R1 and the fourth resistor R3, the current signal at the second end of the second resistor R1 may serve as a second feedback signal and is input into the feedback input terminal of the voltage adjustment module a171, and after receiving the second feedback signal, the voltage adjustment module a171 adjusts the voltage VOUT output to the LED drive assembly a161.

Figure 14:
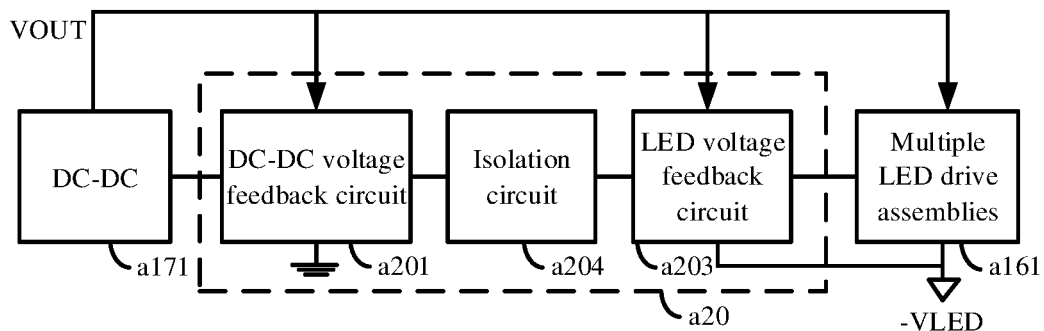
FIG. 14 is a structural schematic diagram of a feedback circuit according to one or more embodiments of the disclosure.

FIG. 14 is a structural schematic diagram of a feedback circuit according to one or more embodiments of the disclosure. The feedback circuit as shown in FIG. 14 includes: an LED voltage feedback circuit a203, an isolation circuit a204, and a DC-DC voltage feedback circuit a201. The DC-DC voltage feedback circuit a201 is connected with a reference ground, the LED voltage feedback circuit a203 has a same reference ground as the LED drive assembly a161, and the reference grounds of the LED voltage feedback circuit a203 and the LED drive assembly a161 are connected with the negative electrode of the second LLC secondary winding, such that a level of the reference ground is −VLED, and the isolation circuit a204 is configured to electrically isolate the LED voltage feedback circuit a203 and the DC-DC voltage feedback circuit a201 on two sides of the isolation circuit. The LED voltage feedback circuit a203 is configured to generate a first intermediate signal according to a first voltage VOUT and a first feedback signal and send the first intermediate signal to the isolation circuit a204, and the isolation circuit converts the first intermediate signal of the LED drive assembly a161 into a second intermediate signal and outputs the second intermediate signal to the DC-DC voltage feedback circuit a201, such that the DC-DC feedback circuit a201 may generate a second feedback signal according to the second intermediate signal and send the second feedback signal to a voltage adjustment module a171, and the problem that different levels of reference ground of circuits on two sides may further be solved.

Figure 15:
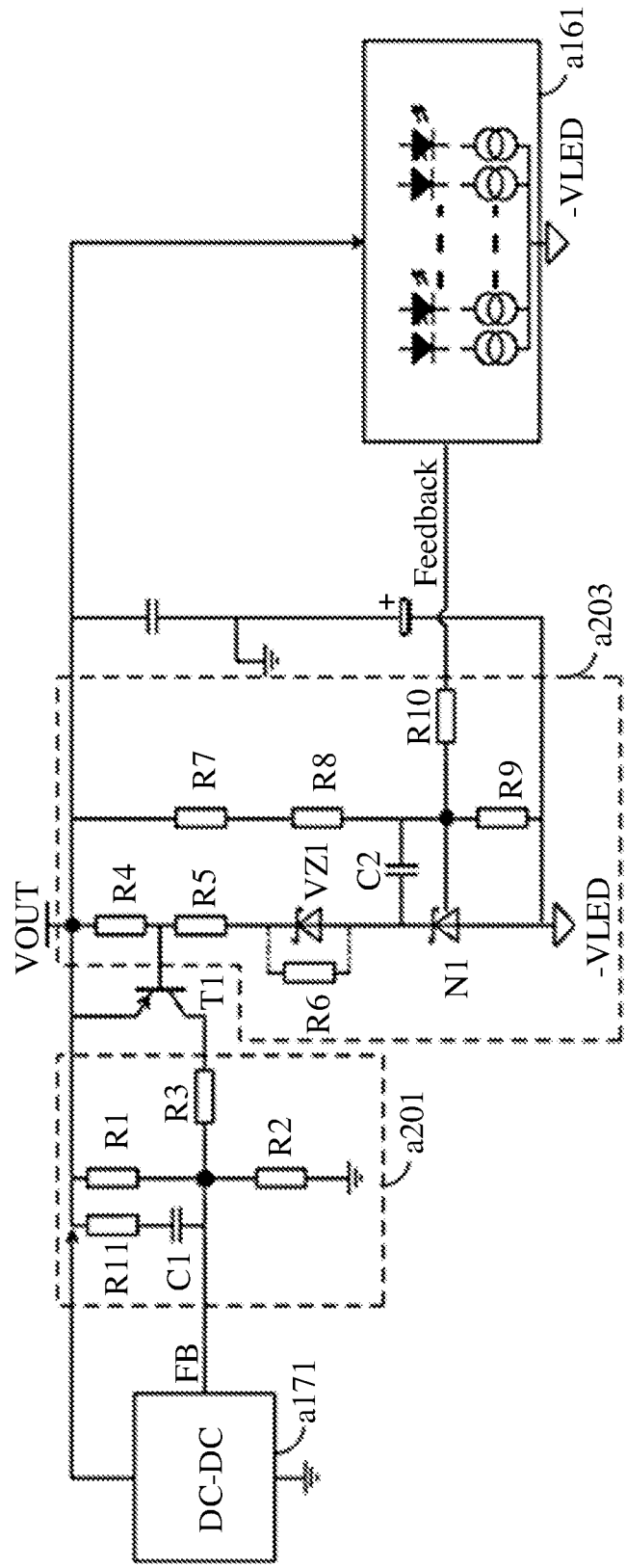
FIG. 15 is a structural schematic diagram of a feedback circuit according to one or more embodiments of the disclosure.

FIG. 15 is a structural schematic diagram of a feedback circuit according to one or more embodiments of the disclosure. As shown in FIG. 15, the isolation circuit a204 may be a switch transistor T1, and the switch transistor T1 may be a triode, a MOS transistor, etc. A first end of the switch transistor T1 is connected with a voltage output terminal VOUT of a voltage adjustment module a171, a second end of the switch transistor is connected with a DC-DC voltage feedback circuit a201, and a control end of the switch transistor is connected with an LED voltage feedback circuit a203, such that the switch transistor T1 may achieve isolation by turn on and cutoff a transmission signal under control of the LED voltage feedback circuit a203.

The DC-DC voltage feedback circuit a201 includes: a second resistor R1, a third resistor R2, and a fourth resistor R3. A first end of the second resistor R1 is connected with a voltage output terminal of the voltage adjustment module a171, a second end of the second resistor R1 is connected with a first end of the third resistor R2, a first end of the fourth resistor R3 is connected with a feedback input terminal of the voltage adjustment module a171, and a second end of the fourth resistor R3 is connected with a second end of the switch transistor T1. A second end of the third resistor R2 is grounded, such that the DC-DC feedback circuit a201 is connected with the reference ground. The DC-DC voltage feedback circuit a201 may independently feedback the VOUT, a resistance value of the second resistor R1 should be set to be larger so as to satisfy a requirement that a DC-DC output voltage may reach a set maximum voltage output value, and the fourth resistor R3 may adjust a minimum value of the output voltage, or a resistance value of the fourth resistor R3 may also be 0.

In some embodiments, the DC-DC voltage feedback circuit a201 may further includes a feedforward circuit for feedforward compensation for an entire DC-DC loop. The feedforward circuit includes a fifth resistor R11 and a second capacitor C1. A first end of the fifth resistor R11 is connected with the voltage output terminal VOUT of the voltage adjustment module a171, and a second end of the fifth resistor R11 is connected with the feedback input terminal of the voltage adjustment module a171 by means of the second capacitor C1.

The LED voltage feedback circuit a203 includes: a reference voltage source N1, a first divider resistor, a second divider resistor R9, a biasing resistor R4, and a current-limiting resistor R5. Resistor R7 in the first divider resistor (including resistor R7 and resistor R8) is connected with the output terminal VOUT of the voltage adjustment module a171, resistor R8 in the first divider resistor is connected with resistor R9 at a first end of the second divider resistor and a control end of the reference voltage source N1, a first end of the reference voltage source N1 is connected with the output terminal VOUT of the voltage adjustment module a171 by means of a first end and a second end of the current-limiting resistor R5 and a first end and a second end of the biasing resistor R4 in sequence, the first end of the biasing resistor R4 and the second end of the current-limiting resistor R5 are connected with the control end of the switch transistor T1, and a second end of the reference voltage source N1 and a second end of the second divider resistor R9 are connected with the negative electrode of the second LLC secondary winding separately, such that the level of the reference ground of the LED voltage feedback circuit a203 is −VLED at the negative electrode of the second LLC secondary winding.

The reference voltage source N1 may be TL431. The reference voltage source N1, the first divider resistor (R7 and R8) and the second divider resistor R9 in the LED voltage feedback circuit a203 may jointly achieve feedback. When VOUT changes, the VOUT controls the conduction and close of the reference voltage source N1 after being subject to voltage division of the first divider resistor and the second divider resistor. Moreover, a first feedback signal generated by a constant-current control chip in the LED drive assembly a161 may also be directly sent to the control end of the reference voltage source N1 via a resistor R10. The biasing resistor R4 is configured to provide a bias current of the reference voltage source N1, the current-limiting resistor R5 is configured to limit a current, and when an entire voltage value of the LED voltage feedback circuit a203 is large, a voltage stabilizing circuit may be additionally arranged between the output terminal VOUT of the voltage adjustment module a171 and the reference voltage source N1, for example, the voltage stabilizing circuit includes a voltage stabilizing diode VZ1. The voltage stabilizing circuit may be configured to protect the reference voltage source N1.

The LED voltage feedback circuit a203 may perform entire voltage feedback according to a sum of entire voltages (VOUT and VLED), such that an influence of voltage fluctuation of the first LLC secondary winding with a fixed voltage on a voltage and a working current of an LED light bar is eliminated by adjusting bandwidth output of the reference voltage source N1 in the LED voltage feedback circuit a203.

Figure 16:
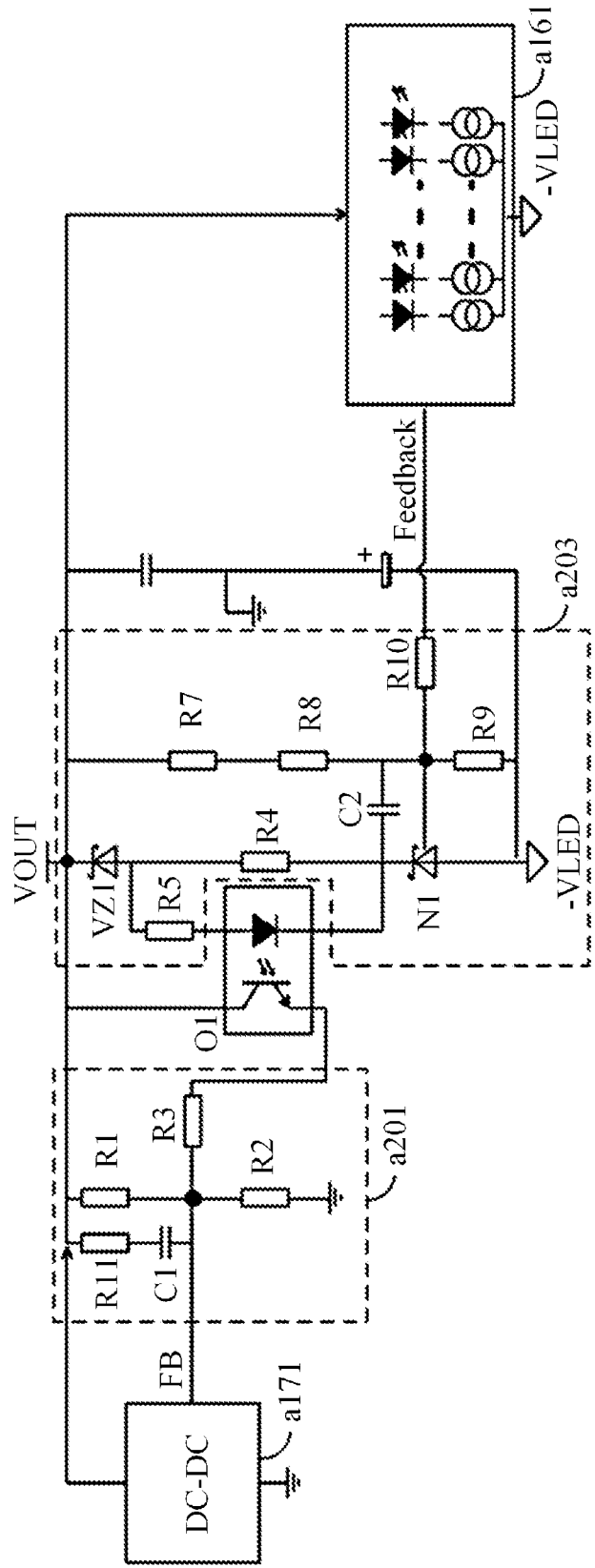
FIG. 16 is a structural schematic diagram of a feedback circuit according to one or more embodiments of the disclosure.

FIG. 16 is a structural schematic diagram of a feedback circuit according to one or more embodiments of the disclosure. As shown in FIG. 16, with a difference from FIG. 15 in that when the isolation circuit a204 is replaced by an optical coupler O1 from a switch transistor T1, adaptive adjustment of a connection relation in the LED voltage feedback circuit a203 is needed. The first end of the reference voltage source N1 is connected with the output terminal VOUT of the voltage adjustment module a171 by means of the biasing resistor R4, the first end of the current-limiting resistor R5 is connected with the output terminal VOUT of the voltage adjustment module a171, the second end of the current-limiting resistor R5 is connected with a first input terminal of the optical coupler O1, the first end R8 of the first divider resistor is connected with a second input terminal of the optical coupler O1 by means of the first capacitor C2, a first output terminal of the optical coupler O1 is connected with the output terminal VOUT of the voltage adjustment module a171, and a second output terminal of the optical coupler O1 is connected with the fourth resistor R3 in the DC-DC voltage feedback circuit a201.

Figure 17:
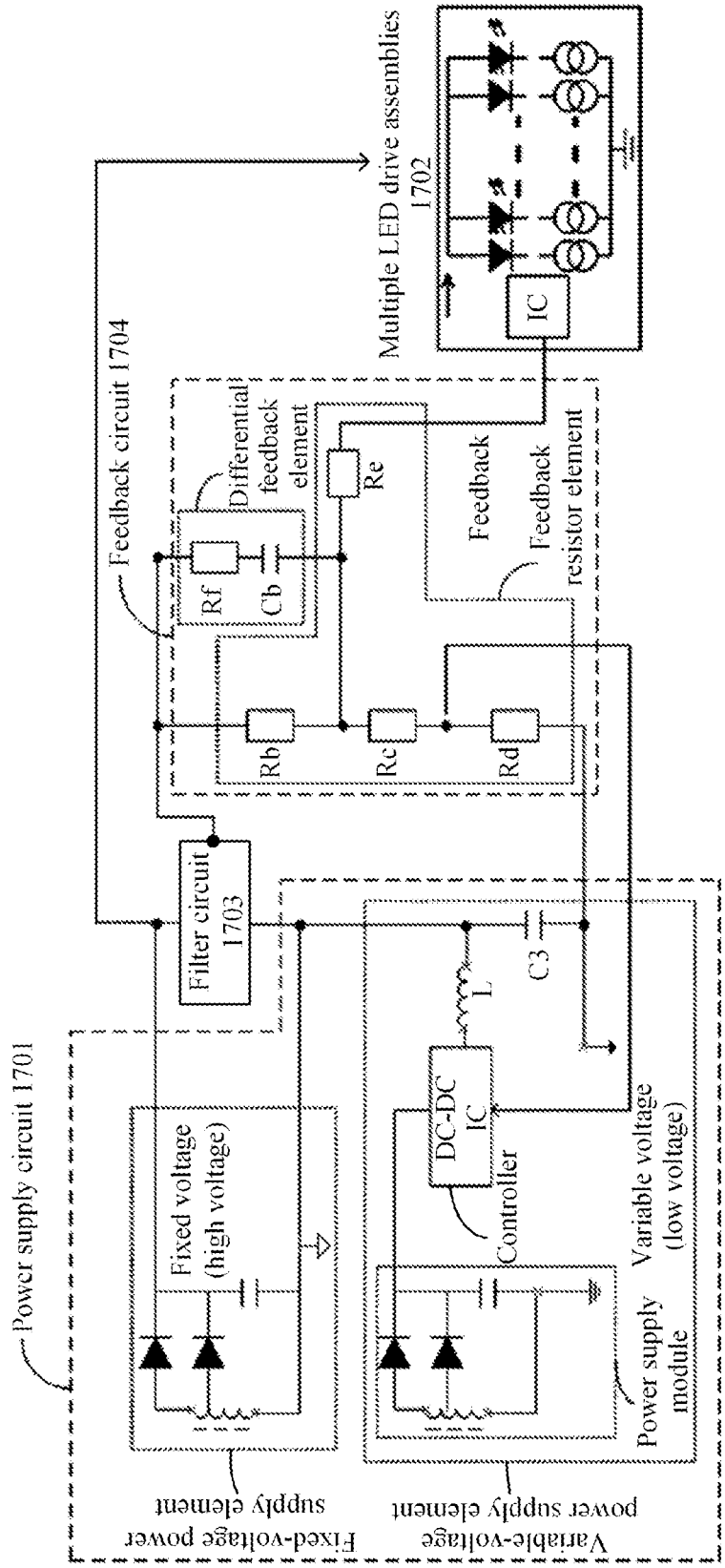
FIG. 17 is a structural schematic diagram of a feedback circuit according to one or more embodiments of the disclosure.

FIG. 17 is a structural schematic diagram of a feedback circuit according to one or more embodiments of the disclosure. FIG. 17 is a structural schematic diagram of a display apparatus according to an embodiment of the disclosure. As shown in FIG. 17, the display apparatus may include a power supply circuit 1701, and an LED drive circuit 1702, a filter circuit 1703 and a feedback circuit 1704 which are connected with the power supply circuit 1701, the filter circuit 1703 is further connected with the feedback circuit 1704. The power supply circuit 1701 is configured to supply power to the LED drive circuit 1702. The power supply circuit 1701 includes a fixed-voltage power supply element and a variable-voltage power supply element, and the fixed-voltage power supply element is superposed on the variable-voltage power supply element, and configured to supply power to the LED drive circuit 1702 in a stepped manner. The filter circuit 1703 is configured to filter a voltage ripple in an output voltage of the fixed-voltage power supply element. The feedback circuit 1704 is configured to sample an output voltage of the filter circuit 1703 and feedback a variation of the output voltage to a controller of the variable-voltage power supply element. The controller is configured to control a voltage of the variable-voltage power supply element according to feedback signal from the feedback circuit 1704.

A feedback sampling point is arranged at an output end of a filter circuit in the display apparatus. This allows indirect adjustment of the voltage of a variable voltage portion by means of sampling an output voltage of the filter circuit, realizing control of an LED drive voltage, which not only allows for feedback in time in variable voltage adjustment when a variable voltage fluctuates, but also allows for timely feedback in variable voltage adjustment when a fixed voltage fluctuates, and effectively reduces voltage instability. Also voltage instability caused by other ripples or noise due to feedback sampling is prevented by means of the filter circuit which filters a voltage ripple in an output voltage of a fixed-voltage power supply element in the display apparatus, further reducing voltage instability when a power supply circuit is supplying power.

By arranging a filter circuit, a voltage ripple in the output voltage of the fixed-voltage power supply element may be filtered, attenuation of a switch ripple output by the DC-DC module may further be reduced, and then the switch ripple output by the DC-DC module may be included in feedback sampling as much as possible and fed back to the controller of the variable-voltage power supply element. In some embodiments, the bandwidth frequency of the filter circuit may be any value greater than 1 Khz and less than 60 Khz. Moreover in order to guarantee a filtering effect, the bandwidth frequency of the filter circuit may be set to be in the range of 2 Khz-10 Khz.

In some embodiments, the filter circuit may be an inductor-capacitor (LC) filter circuit, or a resistor-capacitor (RC) filter circuit, or other types of filter circuits, and may be specifically set according to actual needs, so long as the voltage ripple in the output voltage of the fixed-voltage power supply element may be filtered and the attenuation of the switch ripple output by the DC-DC module may be reduced.

Figure 18:
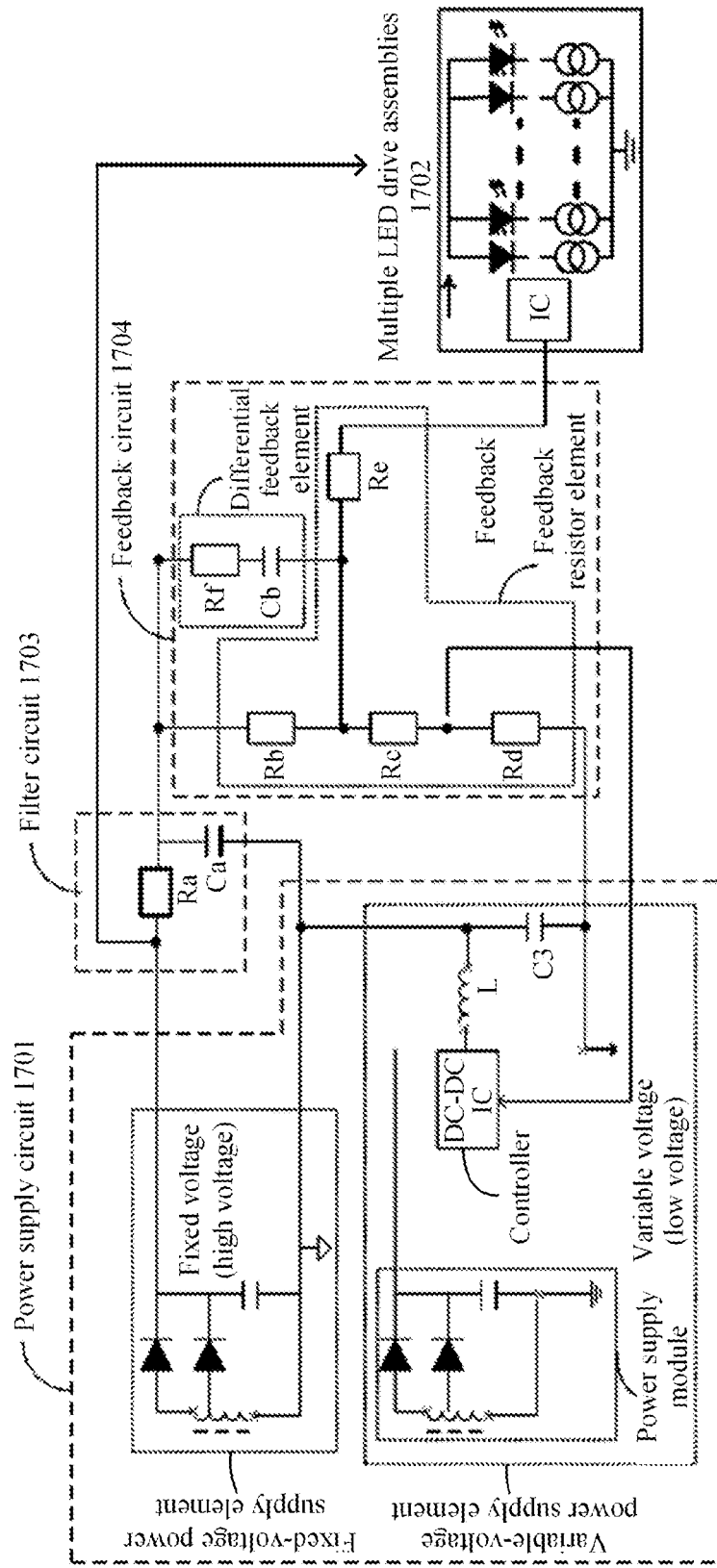
FIG. 18 is a structural schematic diagram of a feedback circuit according to one or more embodiments of the disclosure.

FIG. 18 is a structural schematic diagram of a feedback circuit according to one or more embodiments of the disclosure. As shown in FIG. 18, for example, the filter circuit 1703 is an RC filter circuit, and includes a resistor Ra and a capacitor Ca, one end of the resistor Ra is connected with an output terminal of the fixed-voltage power supply element and the LED drive circuit separately, the other end of the resistor Ra is connected with one end of the capacitor Ca and the feedback circuit separately, and the other end of the capacitor Ca is connected with the fixed-voltage power supply element and the variable-voltage power supply element separately. The resistor Ra and the capacitor Ca may form a low-pass filter circuit, and after the voltage ripple in the output voltage of the fixed-voltage power supply element passes through the low-pass filter circuit, the voltage ripple in the output voltage may be greatly attenuated. Moreover, for the DC-DC module, the resistor Ra in the filter circuit and the resistor Rb, the resistor Rc and the resistor Rd in the feedback circuit 1704 may form a high-pass filter circuit, and the high-pass filter circuit may effectively make the switch ripple output by the DC-DC module included in feedback sampling and feedback the switch ripple to the controller of the variable-voltage power supply element. In this way, the voltage ripple in the output voltage of the fixed-voltage power supply element may be filtered, the attenuation of the switch ripple output by the DC-DC module may further be reduced, then the switch ripple output by the DC-DC module may be included in feedback sampling as much as possible and fed back to the controller of the variable-voltage power supply element, and voltage instability caused by other ripples or noise due to feedback sampling is prevented in a power supply process of the power supply circuit 1701 under a constant-on-time (COT) mode, so as to guarantee stable operation of the DC-DC module.

In reference to the description about the bandwidth frequency of the filter circuit 1703, in the embodiments of the disclosure, when the filter circuit 1703 includes the resistor Ra and the capacitor Ca, when a value of the resistor Ra is larger, a value of the capacitor Ca is smaller, and a bandwidth of the filter circuit may be about 2 Khz-10 Khz, but large attenuation may be caused when the switch ripple output by the DC-DC module passes through the capacitor Ca, which goes against stable operation of the DC-DC module. Thus, in general, a resistor Ra with a small resistance value and a capacitor Ca with a large capacitance value may be set. For example, when the resistance value of the resistor Ra in the filter circuit may be 200 ohms and the capacitance value of the capacitor Ca may be 100 n, the bandwidth frequency of the filter circuit is 5 Khz.

Assuming that a value of a feedback sampling voltage collected by the feedback circuit is U, the voltage value U1 output by the fixed-voltage power supply element includes a direct-current component voltage u1 and a voltage ripple u1, the voltage value U2 output by the DC-DC module includes a direct-current component voltage u2 and a working ripple u2, and the feedback sampling voltage collected by the feedback circuit is U=U1+U2=u1+u1+u2+u2. It can be seen that the feedback sampling voltage collected by the feedback circuit includes the voltage ripple u1 output by the fixed-voltage power supply element and the working ripple u2 output by the DC-DC module, when the display apparatus as shown in FIG. 17 or FIG. 18 of the embodiments of the disclosure is used, the filter circuit including the resistor Ra and the capacitor Ca is arranged, and then the voltage ripple u1 output by the fixed-voltage power supply element is greatly attenuated and may be approximately regarded as 0V after passing through the filter circuit 1703. Thus, the feedback sampling voltage collected by the feedback circuit 1704 is U=U1+U2=u1+u2+u2, which filters the switch voltage ripple in the output voltage of the fixed-voltage power supply element, and makes the voltage fluctuation in the fixed-voltage power supply element included in the feedback sampling as much as possible and fed back to the controller of the variable-voltage power supply element, so as to reduce voltage instability in the power supply process of the power supply circuit in the COT mode, further to guarantee stable operation of the DC-DC module.

A feedback sampling point is arranged at an output portion of a filter circuit in the display apparatus This allows indirect adjustment of the voltage of a variable voltage portion by sampling an output voltage of the filter circuit, realizing control of an LED drive voltage, which not only allows for timely feedback in variable voltage adjustment when a variable voltage fluctuates, but also allows for timely feedback in constant voltage adjustment when a fixed voltage fluctuates, so as to obtain a stable output voltage in multiple LED driving, further to improve the jitter problem of a display panel.

In some embodiments, the feedback circuit may include: a feedback resistor element and a differential feedback element. The feedback resistor element is connected with an output terminal of the filter circuit, the LED drive circuit and the controller, and the differential feedback element is connected with the output terminal of the filter circuit and the feedback resistor element. The differential feedback element is arranged in the feedback circuit, that is, feedforward is additionally arranged, such that the output voltage ripple may be reduced, and the stability of voltage output to the LED drive circuit is improved.

In some embodiments, the feedback resistor element may include: a resistor Rb, a resistor Rc, a resistor Rd, and a resistor Re. As shown in FIG. 17, one end of the resistor Rb is connected with an output terminal of a filter circuit; the other end of the resistor Rb is connected with one end of the resistor Rc and one end of the resistor Re; the other end of the resistor Rc is connected with one end of the resistor Rd and a controller; the other end of the resistor Rd is grounded; and the other end of the resistor Re is connected with an LED drive circuit.

In some embodiments, the differential feedback element may include: a capacitor Cb. One end of the capacitor Cb is connected with the output terminal of the filter circuit, and the other end of the capacitor Cb is connected with one end of a resistor Re. In another embodiment, the differential feedback unit includes: a capacitor Cb and a resistor Rf. As shown in FIG. 17, one end of the resistor Rf is connected with the output terminal of the filter circuit, the other end of the resistor Rf is connected with one end of the capacitor Cb, and the other end of the capacitor Cb is connected with one end of a resistor Re.

In some embodiments, the variable-voltage power supply element may include: a power supply module, a controller, an inductor and a third capacitor C3. The power supply module is connected with the controller, the controller is connected with one end of the inductor, the other end of the inductor is connected with one end of the third capacitor C3, and the other end of the third capacitor C3 is grounded. The controller is a controller in a fixed on-time COT mode, for example, a BUCK topology controller.

Since differential feedback is formed by the resistor Rf and the capacitor Cb, a DC-DC response speed is increased. However, when the capacity of the third capacitor C3 is too large, the phenomena that charges may not be released after shutdown, a residual voltage is high, and a fixed voltage output is superposed on the residual voltage during startup next time, causing flickering of an LED light bar. Thus, in some embodiments, the capacity of the capacitor Cb is equivalent to that of the third capacitor C3, or the capacity of the third capacitor C3 is less than that of the capacitor Cb, so as to solve flickering issue of the LED light bar during startup, and further to reduce cost. In some embodiments, a capacitance value of the third capacitor C3 is less than a capacitance value of the capacitor Cb, and a difference between the capacitance value of the third capacitor C3 and the capacitance value of the capacitor Cb is less than a difference threshold. The difference threshold may be set according to actual needs, and a value of the difference threshold is not further limited in the embodiments of the disclosure.

Figure 19:
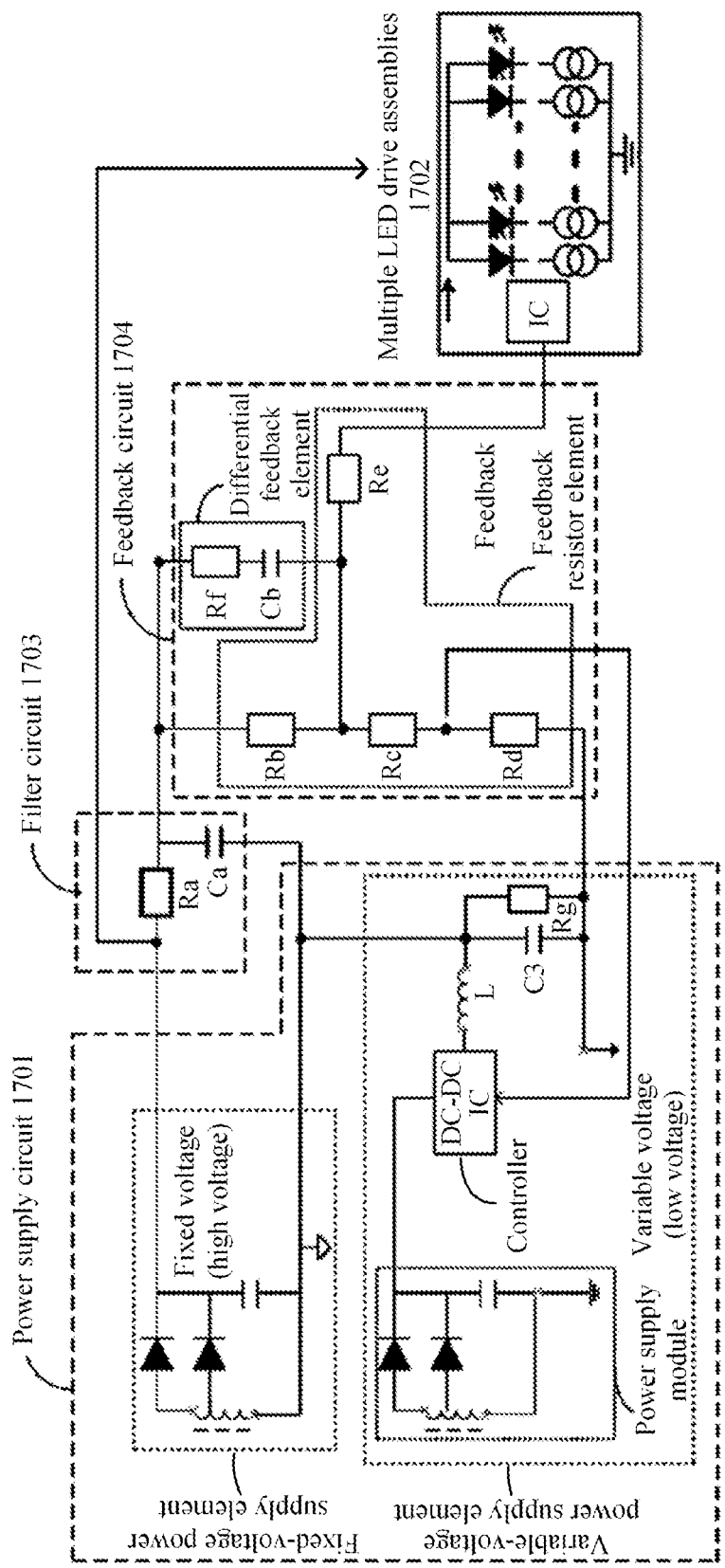
FIG. 19 is a structural schematic diagram of a feedback circuit according to one or more embodiments of the disclosure.

FIG. 19 is a structural schematic diagram of a feedback circuit according to one or more embodiments of the disclosure. As shown in FIG. 19, a variable-voltage power supply element further includes a resistor Rg, wherein one end of the resistor Rg is connected with one end of a third capacitor C3, and the other end of the resistor Rg is connected with the other end of the third capacitor C3. The purpose of arranging additional resistor Rg is that when a display device is shutdown, the resistor Rg is used to consume the energy of the third capacitor C3, so as to prevent a residual voltage of the third capacitor C3 from being high when the display device is shutdown, and therefore the problem of flickering of the LED light bar during startup may be solved.

Step Power Supply Via Multiple Power Sources

Figure 20:
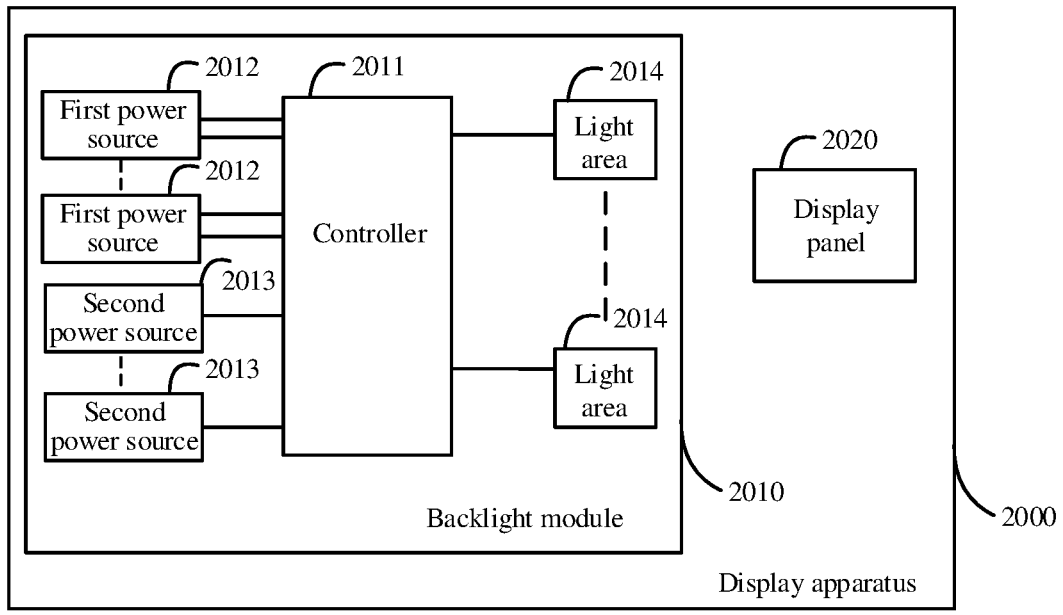
FIG. 20 is a structural schematic diagram of a display apparatus according to one or more embodiments of the disclosure.

FIG. 20 is a structural schematic diagram of a display apparatus according to one or more embodiments of the disclosure. As shown in FIG. 20, the display apparatus 2000 includes a backlight module 2010 and a display panel 2020. A plurality of power sources, a controller 2011 and a plurality of light areas corresponding to the plurality of power sources are arranged in the backlight module. The plurality of power sources include two types of power sources, one type of power source is a first power source 2012, and the first power source 2012 is configured to provide a positive power supply signal for the controller and drive a light area corresponding to the first power source to work. The other type of power source is a second power source 2013, and the second power source 2013 is configured to drive a light area 2014 corresponding to the second power source 2013 to work. It is noted that a corresponding relation between the power sources and the light areas in the embodiments may be that one power source corresponds to a plurality of light areas, or one power source corresponds to one light area; and the number of the first power source and the number of the second power source may be one or more, which is not specifically limited herein. The light area emits light by receiving a drive signal generated by the controller. The drive signal generated by the controller is generated in a negative voltage drive mode, specifically, the plurality of power sources are configured to output a negative power supply signal and a negative reference signal, the drive signal is generated by the controller 2011 according to a control signal and the received negative power supply signal and negative reference signal of the power source. In addition, the controller 2011 in the embodiments may also be configured to control the first power source to work and the second power source to be turned off in a standby mode. In a non-standby mode, the first power source and the second power source are controlled to be in a working state.

Figure 21:
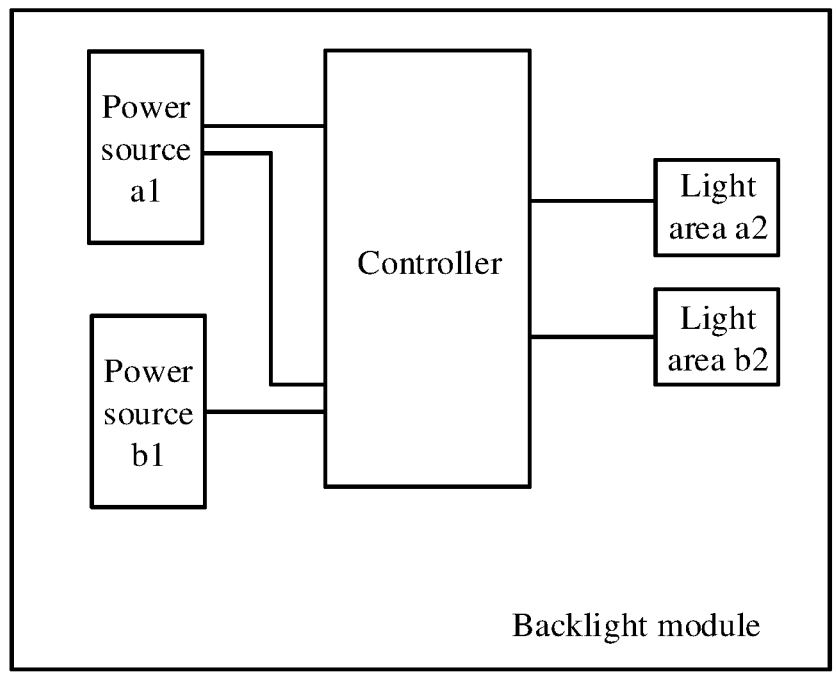
FIG. 21 is a structural schematic diagram of a backlight module according to one or more embodiments of the disclosure.

FIG. 21 is a structural schematic diagram of a backlight module according to one or more embodiments of the disclosure. As shown in FIG. 21, as an example of two power sources and two light areas, one power source corresponds to one light area, the power source a1 corresponds to the light area a2, and the power source b1 corresponds to the light area b2. The power source a1 is the first power source mentioned in FIG. 20 for providing a positive power supply signal to a controller, and the power source a1 also provides a negative reference signal and a negative power supply signal to the controller, such that the controller drives the light area a2 to emit light under the action of the negative reference signal and the negative power supply signal of the power source a1, and a control signal generated by the controller according to an external instruction. The power source b1 is the second power source mentioned in FIG. 20 for providing a negative reference signal and a negative power supply signal for a main board, such that the controller drives the light area b2 to emit light under the action of the reference signal and the power supply signal of the power source b1 and a control signal generated by the controller according to an external instruction. The plurality of power sources drive the lights areas corresponding to the power sources by the controller. The above apparatus is able to avoid the situation where since needed power is continuously increased due to increasing light areas, an existing apparatus may not satisfy a power consumption requirement of the light areas. Due to the power consumption requirement of the light areas, a display interface of the display apparatus has problems, which influences a user's view.

Figure 22:
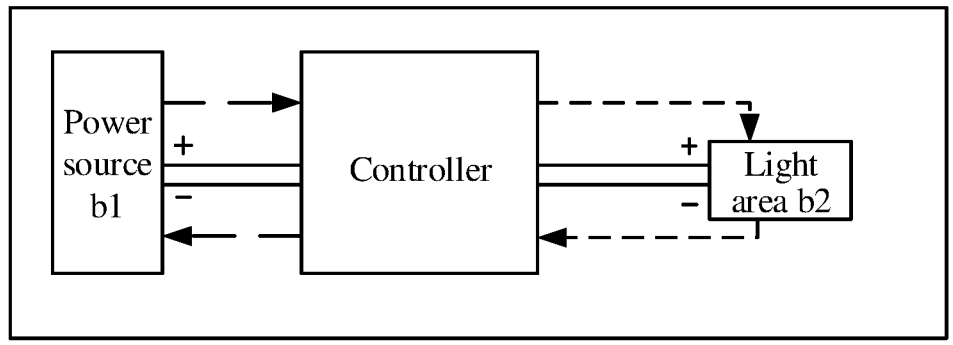
FIG. 22 is a schematic diagram of a current direction of a light area according to one or more embodiments of the disclosure.

FIG. 22 is a schematic diagram of a current direction of a light area according to one or more embodiments of the disclosure. As shown in FIG. 22, a controller is driven in an existing positive voltage driving mode. As an example of the power source b1 and the light area b2, a current of the light area b2 starts from the corresponding power source b1 corresponding to the light area b2, passes through a controller, a positive terminal of the light area b2, a negative terminal of the light area b2 and the controller, and returns to the corresponding power source b1 to form a current loop. A power supply signal of the power source b1 for a light-emitting drive module is a positive electric signal.

Figure 23:
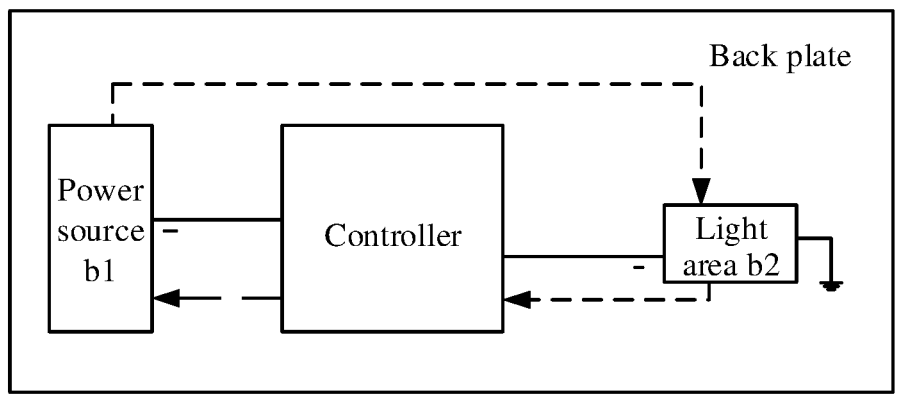
FIG. 23 is a schematic diagram of a current direction of a light area according to one or more embodiments of the disclosure.

In some embodiments, FIG. 23 is a schematic diagram of a current direction of a light area according to one or more embodiments of the disclosure. As shown in FIG. 23, as an example of a power source b1 and a light area b2, a current of the light area b2 starts from the corresponding power source b1 corresponding to the light area b2, passes through a back plate, a positive terminal of the light area b2, a negative terminal of the light area b2 and a controller, and returns to the corresponding power source b1. In this process, a power supply signal of the power source b1 for a light-emitting drive module is a negative power supply signal. FIG. 23 merely shows a schematic diagram of a current direction between any of the plurality of power sources and its corresponding light area in a negative voltage drive mode. Current direction loops between the remaining power sources and their corresponding light areas are similar to that in FIG. 23, and a dashed line in FIG. 23 represents the current direction merely and does not represent an actual connection line. Compared with a display apparatus in a positive voltage drive mode, a light area drive mode in the display apparatus is a negative voltage drive mode, in the negative voltage drive mode, the positive terminal of the light area may be connected with the back plate by means of screws or directly grounded. By means of the connection relation, connection lines between the light area and the controller and connectors of the connection lines may be reduced, so as to reduce an area of the controller on a circuit board.

Figure 24:
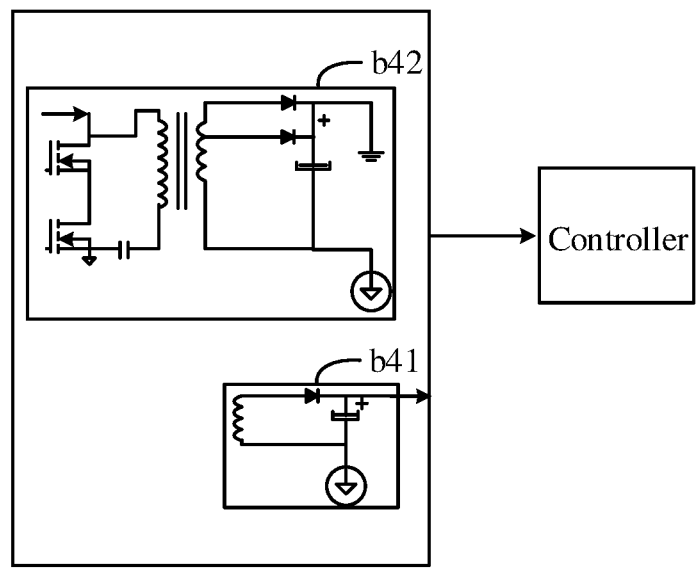
FIG. 24 is a structural schematic diagram of a power source according to one or more embodiments of the disclosure.

FIG. 24 is a structural schematic diagram of a power source according to one or more embodiments of the disclosure. As shown in FIG. 24, a second power source includes: a coil winding module b41 and a first isolation voltage conversion module b42. The coil winding module b41 is coupled with a primary coil in the first isolation voltage conversion module b42, and the coil winding module b41 is connected with a light area by a controller. The first isolation voltage conversion module b42 may be configured to receive a power supply signal, perform voltage conversion on the power supply signal received, and then output a negative reference signal to the controller and the coil winding module b41. The coil winding module b41 is configured to receive and couple the power supply signal and the negative reference signal generated by the first isolation voltage conversion module b42, to obtain a negative power supply signal, and provide the negative power supply signal to the controller. The negative power supply signal and the negative reference signal are provided for the controller to generate a drive signal.

Figure 25:
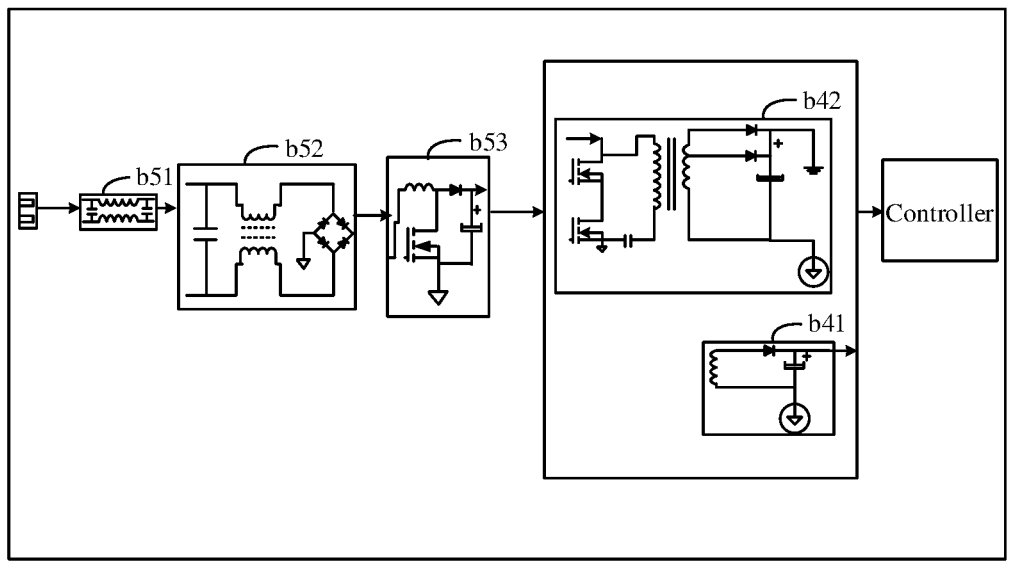
FIG. 25 is a structural schematic diagram of a power source according to one or more embodiments of the disclosure.

FIG. 25 is a structural schematic diagram of a power source according to one or more embodiments of the disclosure. As shown in FIG. 25, the filter module b51 filters received mains, for example, by high frequency filtering, etc. In some embodiments, the filter module b51 may be omitted. A filtering and rectification module b52 is configured to filter and rectify a filtered signal and convert the alternating-current wave signal into a full-wave signal. After processing by the filtering and rectification module b52, a power factor correction module b53 adjusts a phase of a power supply signal generated by the filtering and rectification module b52, such that phases of a current and a voltage are consistent, and a power factor of the power source may be effectively improved. In some embodiments, the power factor correction module b53 may be omitted. The power factor correction module b53 provides the corrected power supply signal for the coil winding module b41 and the first isolation voltage conversion module b42. According to the power source structure of the embodiment, a negative power supply signal and a negative reference signal may be output to the controller by additionally arranging the coil winding b41, such that the controller may drive the light areas to work in a negative voltage drive mode.

Figure 26:
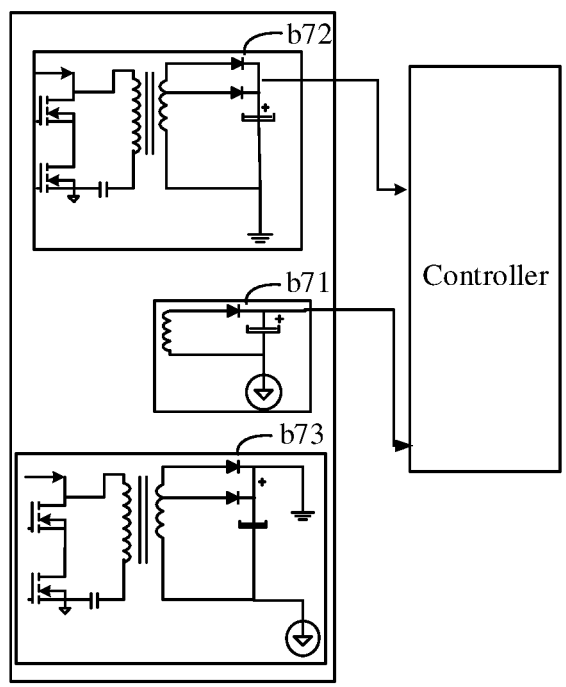
FIG. 26 is a structural schematic diagram of a power source according to one or more embodiments of the disclosure.

FIG. 26 is a structural schematic diagram of a power source according to one or more embodiments of the disclosure. As shown in FIG. 26, a first power source includes: a coil winding module b71, a second isolation voltage conversion module b72, and a third isolation voltage conversion module b73. The second isolation voltage conversion module b72 is configured to receive a power supply signal, and perform voltage conversion on the power supply signal, and then the second isolation voltage conversion module b72 generates a positive power supply signal and provides the positive power supply signal to a controller connected with an output terminal of the second isolation voltage conversion module b72. The third isolation voltage conversion module b73 is configured to receive a power supply signal and perform voltage conversion on the power supply signal, and then the third isolation voltage conversion module b73 generates a negative reference signal. The coil winding module b71 is in coupling connection to the second isolation voltage conversion module b72, the coil winding module b71 is connected with the controller, and the coil winding module b71 is configured to receive and couple the power supply signal and the negative reference signal generated by the third isolation voltage conversion module b73, to obtain a negative power supply signal. The negative power supply signal and the negative reference signal are both provided for the controller to generate a drive signal. According to the power source structure of the embodiments, a negative power supply signal and a negative reference signal may be output to the controller, such that the controller may drive the light areas to work in a negative voltage drive mode, and the positive power supply signal may further be provided for the controller to work.

Figure 27:
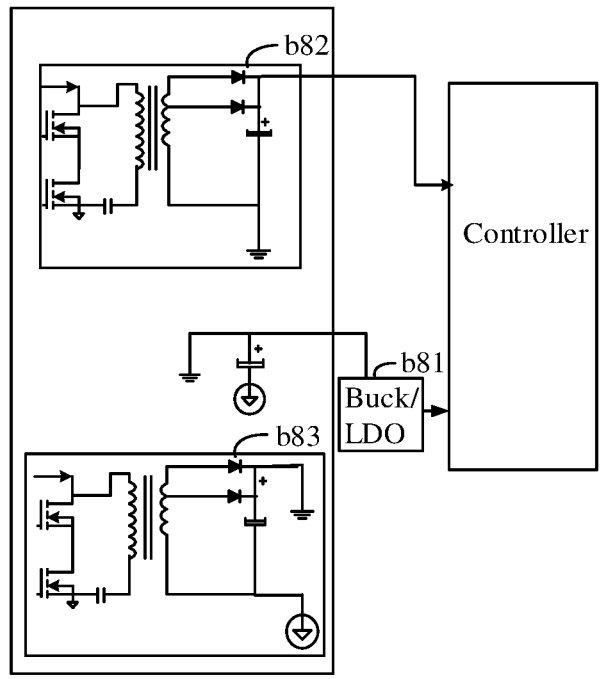
FIG. 27 is a structural schematic diagram of a power source according to one or more embodiments of the disclosure.

FIG. 27 is a structural schematic diagram of a power source according to one or more embodiments of the disclosure. As shown in FIG. 27, a first power source includes: a buck module b81, a first voltage conversion module b82, and a second voltage conversion module b83. The first voltage conversion module b82 is configured to perform voltage conversion on a received power supply signal to obtain a positive power supply signal, and send the positive power supply signal to a controller connected with an output terminal of the first voltage conversion module to supply power to the controller. The second voltage conversion module b83 is configured to perform voltage conversion on a received power supply signal to obtain a negative reference signal, and send the negative reference signal to the controller connected with the second voltage conversion module and the buck module b81. A first input terminal of the buck module b81 is connected with the second voltage conversion module b83, a second input terminal of the buck module b81 is grounded, and the buck module b81 is configured to output a negative power supply signal based on the negative reference signal generated by the second voltage conversion module b83 and output the negative power supply signal to the controller connected with the buck module. The negative supply signal and the negative reference signal are provided for the controller to generate a drive signal, to drive the light areas to work, and the buck module b81 may be implemented by some buck circuits, for example, a DC-DC converter such as a Buck circuit, or a low dropout regulator (LDO).

Figure 28:
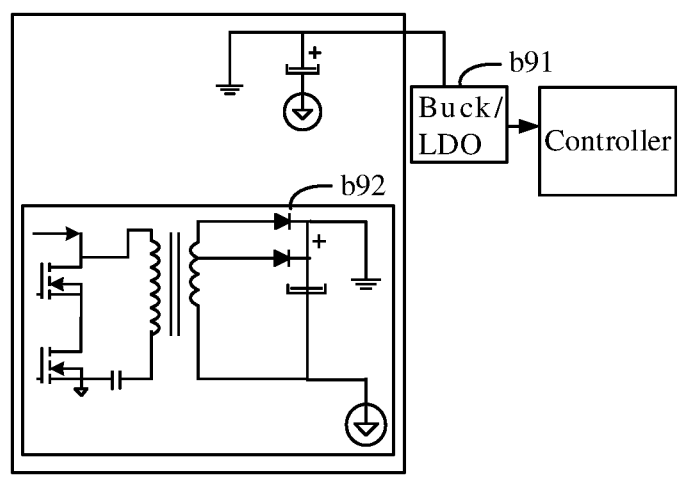
FIG. 28 is a structural schematic diagram of a power source according to one or more embodiments of the disclosure.

FIG. 28 is a structural schematic diagram of a power source according to one or more embodiments of the disclosure. As shown in FIG. 28, the second power source includes: a buck module b91 and a third voltage conversion module b92. The third voltage conversion module b92 is configured to receive a power supply signal, perform voltage conversion on the power supply signal to obtain a negative reference signal, and provide the negative reference signal to the buck module b91 connected with the third voltage conversion module b92. A first input terminal of the buck module b91 is connected with the third voltage conversion module b92, a second input terminal of the buck module is grounded, and the buck module b91 is configured to output, based on the negative reference signal generated by the third voltage conversion module b92, a negative power supply signal to the controller connected with an output terminal of the third voltage conversion module b92. The negative power supply signal and the negative reference signal are provided for the controller to generate a drive signal, to drive the light area to work, and the buck module b91 may be implemented by some buck circuits, for example, a DC-DC converter such as a Buck circuit, or a low dropout regulator (LDO). Compared with a power supply manner which requires to arrange coil winding additionally, the above power supply method is suitable for a scenario where a negative reference voltage is set to be low enough, and buck operation may be performed by directly using a buck circuit or a low dropout regulator, to obtain a negative power supply signal. Moreover, when it is inconvenient to additional arrange the winding module, the apparatus provided in the above embodiment is easier to implement.

Isolation Circuit Design

Figure 29:
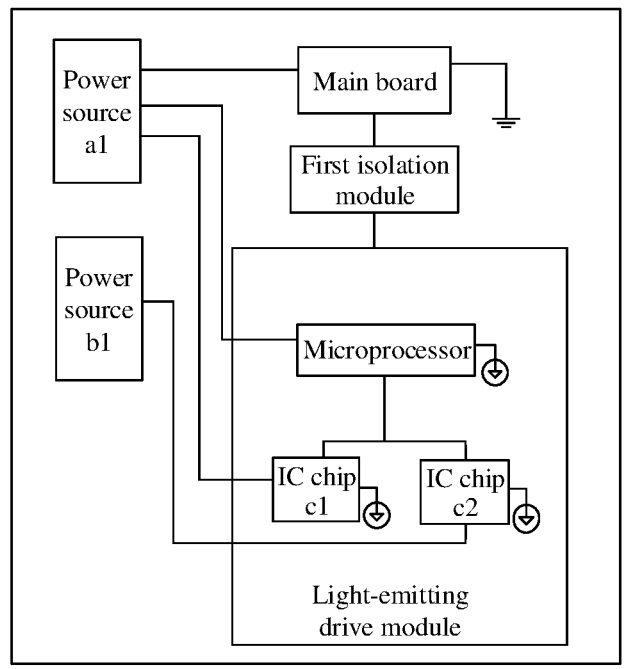
FIG. 29 is a structural schematic diagram of an isolation manner in a negative voltage drive mode according to one or more embodiments of the disclosure.

FIG. 29 is a structural schematic diagram of isolation in a negative voltage drive mode according to one or more embodiments of the disclosure. As shown in FIG. 29, for example, two power sources of a1 power source a and a power source b1 are provided, the power source a1 is a first power source, and the power source b1 is a second power source. When a reference ground of a microprocessor is a negative reference signal generated by the power source, since a reference ground of a main board is the ground, a first isolation module needs to be arranged between the main board and a light-emitting drive module, that is, the main board is connected with the microprocessor in the light-emitting drive module by the first isolation module. The first isolation module is configured to perform level conversion on a control signal generated by the main board and send the obtained control signal to the microprocessor for analysis, so as to guarantee normal transmission of a signal between the main board and the microprocessor, and to avoid the situation that normal transmission may not be performed due to interference between the signals caused by different reference grounds of the main board and the microprocessor.

In the first isolation module, for a high-frequency signal (for example, a clock signal, a synchronous signal, etc.), a capacitance isolation device or a magnetic isolation device may be used to isolate the two reference grounds, and for a low-frequency signal (for example, a chip selection signal), isolation may be directly achieved by a non-isolated level conversion circuit. Specifically, during connection, an output signal of the main board is connected with the isolation device in the first isolation module and an input terminal of the level conversion circuit separately, and the isolation device in the first isolation module and the output terminal of the level conversion circuit are connected with the microprocessor module. Moreover, an IC chip c1 is connected with a negative terminal of a light area a2, an IC chip c2 is connected with a negative terminal of a light area b2, and positive terminals of the light area a2 and the light area b2 are grounded. The connection mode of the light area a2 to the light area b2 is not shown in FIG. 29.

Moreover, when negative reference voltages generated by the power source a1 and the power source b1 are different, that is, the negative reference voltage provided by the power source a1 for the microprocessor and the IC chip c1 is one reference ground, but the negative reference voltage provided by the power source b1 for the IC chip c2 is another reference ground, and the reference grounds of the two negative reference signals are different, such that one first isolation module, not shown in FIG. 29, is still needed between the microprocessor and the IC chip c2.

Figure 30:
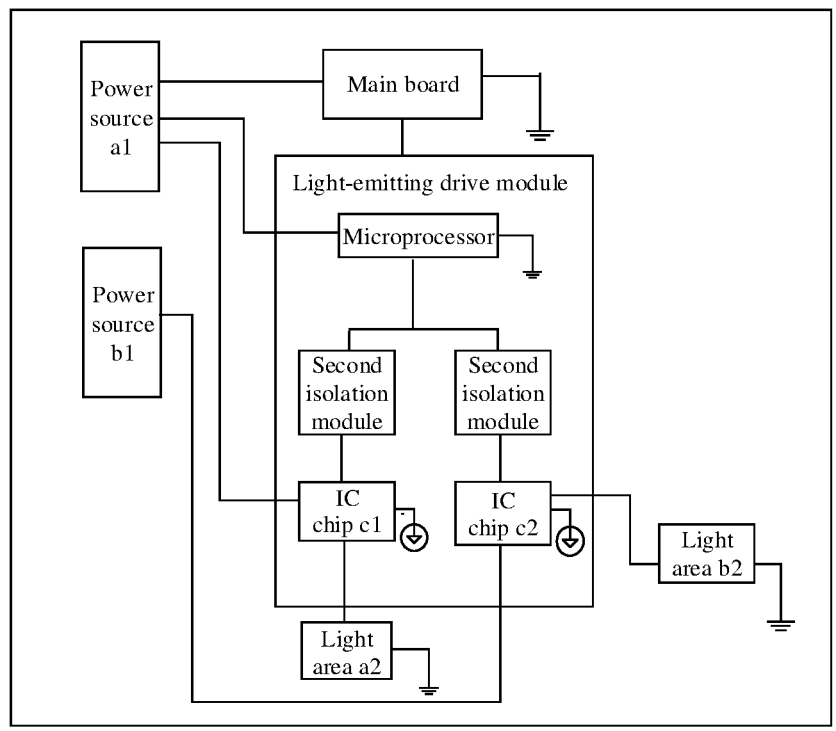
FIG. 30 is a structural schematic diagram of an isolation manner in a negative voltage drive mode according to one or more embodiments of the disclosure.

FIG. 30 is a structural schematic diagram of isolation in a negative voltage drive mode according to one or more embodiments of the disclosure. As shown in FIG. 30, when the reference ground of the microprocessor is identical to that of the main board, as the reference ground of the microprocessor is different from that of two constant-current drive modules in the figure, two second isolation modules are arranged. The second isolation modules are configured to perform level conversion on control signals analyzed by the microprocessor and send the converted control signals to the corresponding constant-current drive modules, and the second isolation modules have one-to-one correspondence with the constant-current drive modules. The constant-current drive module receives the negative reference signal and the negative power supply signal, and provides a drive signal for the corresponding light area according to the converted control signal, the negative reference signal and the negative power supply signal.

In some embodiments, input terminals of the two second isolation modules may be connected with the microprocessor, output terminals of the two second isolation modules are connected with input terminals of the corresponding constant-current drive modules (that is, connected with the IC chip c1 and the IC chip c2 separately) respectively. After performing level conversion on the signals analyzed by the microprocessor, the two second isolation modules send the signals to the corresponding constant-current drive modules. By the isolation, signal transmission between different reference grounds may be guaranteed, and electromagnetic interference of signals caused by different reference grounds is avoided.

In some embodiments, the display apparatus further includes a plurality of switches, and the power sources and the switches are in a one-to-one correspondence. The plurality of power sources may also be connected by the switches. One connection mode is as follows: a power source for supplying power to the main board serves as a main power source, the remaining power sources may be connected behind a filter module in the main power source by the switches corresponding the remaining power sources, the switches may be controlled by switch indication signals, and specifically, switch control signals are sent by the main board.

In some embodiments, the disclosure further provides a display control method, used in the above display apparatus. The method includes: determining that whether a display apparatus is in a standby mode; controlling a first power source to work and controlling a second power source to be turned off in response to the display apparatus being in the standby mode currently and controlling the first power source and the second power source to work in response to the display apparatus being not in the standby mode currently.

In the above display apparatus, first, the first power source connected with a controller may be turned on, such that the power source may provide a positive power supply signal for a main board. The controller may receive a control instruction of a user for the display apparatus and determine whether the display apparatus is in the standby mode. For example, the controller may receive an operation on a power button on the body of the display apparatus and an operation to start the display apparatus via a button on a remote control. When the user operates the power button on the display apparatus to cause the display apparatus power up and does not start the display apparatus via the remote control, it indicates that the display apparatus is in the standby mode currently. When the user operates the power button on the display apparatus and then starts the display apparatus by a button on the remote control, it indicates that the display apparatus is not in the standby mode currently. After the current mode is determined, the controller controls a working state of the power source in the display apparatus. That is, when the display apparatus is in the standby mode currently, the controller may control the second power source to turn off while the first power source continues to work; and when the display apparatus is not in the standby mode currently, the controller may control the first power source and the second power source to work simultaneously. Each power source may be provided with a switch device, and the switch devices may be configured to receive switch control signals sent from the controller, so as to control the power sources to start or stop working. In some embodiments, the power source in the display apparatus is controlled to be turned on and off in the standby mode and the non-standby mode by the controller, so as to reduce power consumption of the display apparatus and loss of the display apparatus, and to prolong service life of the display apparatus.

In some embodiments, the negative power supply signals and the negative reference signals of the plurality of power sources also match the power of light-emitting elements in the corresponding light areas. That is, before determining that whether a display apparatus is in a standby mode, all the light-emitting elements of a backlight module need to be divided according to a rule that the light-emitting elements with same power belong to one light area, and a plurality of light areas are obtained.

It is appreciated that the disclosure is not limited to the precise structures that have been described above and shown in the accompanying drawings, and that various modifications and changes may be made without departing from its scope. The scope of the disclosure is limited only by the appended claims.

What is claimed is:

1. A display apparatus, comprising:
   a power supply circuit; and
   a light emitting diode (LED) drive circuit, a filter circuit and a feedback circuit in connection with the power supply circuit;
   wherein the filter circuit is further connected with the feedback circuit;
   the power supply circuit is configured to supply power to the LED drive circuit;
   the power supply circuit comprises a fixed-voltage power supply element and a variable-voltage power supply element, and the fixed-voltage power supply element is superposed on the variable-voltage power supply element and configured to supply power to the LED drive circuit in a stepped manner;
   the filter circuit is configured to filter a voltage ripple in an output voltage of the fixed-voltage power supply element;
   the feedback circuit is configured to sample an output voltage of the filter circuit and feedback a variation of the output voltage to a controller of the variable-voltage power supply element;
   the controller is configured to control a voltage of the variable-voltage power supply element according to the variation of the output voltage feedback from the feedback circuit; and
   wherein the power supply circuit comprises a resonant converter (LLC), the LLC comprises a primary winding, a first secondary winding and a second secondary winding, a voltage of the primary winding is converted into a first voltage according to the first secondary winding, and the voltage of the primary winding is converted into a second voltage according to the second secondary winding; and the first voltage is adjusted to a third voltage, and the LED drive circuit is supplied with power according to a sum of the third voltage and the second voltage.

2. The display apparatus according to claim 1, wherein the filter circuit comprises a first resistor and a first capacitor,
   an end of the first resistor is connected with an output terminal of the fixed-voltage power supply element and the LED drive circuit separately, the other end of the first resistor is connected with an end of the first capacitor and the feedback circuit separately, and the other end of the first capacitor is connected with the fixed-voltage power supply element and the variable-voltage power supply element separately.

3. The display apparatus according to claim 1, wherein a bandwidth frequency of the filter circuit is greater than a frequency of the voltage ripple in the fixed-voltage power supply element, and the bandwidth frequency of the filter circuit is less than a frequency of a switch ripple output by a power supply module corresponding to a fixed winding in the fixed-voltage power supply element.

4. The display apparatus according to claim 1, wherein the feedback circuit comprises: a feedback resistor unit and a differential feedback unit;
   wherein the feedback resistor unit is connected with an output terminal of the filter circuit, the LED drive circuit and the controller of the variable-voltage power supply element, and the differential feedback unit is connected with the output terminal of the filter circuit and the feedback resistor unit.

5. The display apparatus according to claim 4, wherein the feedback resistor unit includes: a second resistor, a third resistor, a fourth resistor, and a fifth resistor, and one end of the second resistor is connected with an output terminal of a filter circuit; the other end of the second resistor is connected with one end of the third resistor and one end of the fifth resistor; the other end of the third resistor is connected with one end of the fourth resistor; the other end of the fourth resistor is grounded; and the other end of the fifth resistor is connected with the LED drive circuit.

6. The display apparatus according to claim 5, wherein the differential feedback unit comprises: a second capacitor; wherein an end of the second capacitor is connected with the output terminal of the filter circuit, and the other end of the second capacitor is connected with an end of the fifth resistor.

7. The display apparatus according to claim 5, wherein the differential feedback unit comprises: a second capacitor and a sixth resistor; wherein an end of the sixth resistor is connected with the output terminal of the filter circuit, the other end of the sixth resistor is connected with an end of the second capacitor, and the other end of the second capacitor is connected with an end of the fifth resistor.

8. The display apparatus according to claim 1, wherein, a first voltage of the primary winding is adjusted to a third voltage according to the variation of the output voltage feedback from the feedback circuit.

9. The display apparatus according to claim 8, further comprising: an optical coupler configured to perform optocoupler isolation on a feedback signal from the feedback circuit.

* * * * *